United States Patent [19]

Hickey

[11] Patent Number: 5,475,835
[45] Date of Patent: Dec. 12, 1995

[54] AUDIO-VISUAL INVENTORY AND PLAY-BACK CONTROL SYSTEM

[75] Inventor: Paul R. Hickey, Mission Viejo, Calif.

[73] Assignee: Research Design & Marketing Inc., Orange, Calif.

[21] Appl. No.: 24,383

[22] Filed: Mar. 2, 1993

[51] Int. Cl.[6] .............................. G06F 17/40; G06F 1/00; G06F 15/24
[52] U.S. Cl. .................................. 395/600; 369/2; 348/7; 348/13; 348/552; 348/473; 348/734; 345/902; 345/173; 364/514 R; 364/403; 340/825.24; 340/825.06; 340/825.72; 455/151.2; 455/4.2; 455/6.2
[58] Field of Search .............................. 369/1, 2, 6, 29; 381/28, 77; 358/903, 142, 194.1; 340/825.24, 825.25, 825.06, 825.72; 345/173, 146, 35–40, 902; 395/600, 155, 156, 161; 455/151.2, 4.2, 6.2

[56] References Cited

U.S. PATENT DOCUMENTS

| | | | |
|---|---|---|---|
| 4,521,870 | 6/1985 | Babbel et al. | 364/900 |
| 4,703,450 | 10/1987 | Sueyoshi et al. | 358/903 X |
| 4,718,112 | 1/1988 | Shinoda | 455/151 |
| 4,725,694 | 2/1988 | Auer et al. | 345/173 |
| 4,746,919 | 5/1988 | Reitmeier | 340/825.56 |
| 4,787,063 | 11/1988 | Muguet | 364/900 |
| 4,855,725 | 8/1989 | Fernandez | 340/706 |
| 4,873,584 | 10/1989 | Hashimoto | 358/335 |
| 4,885,575 | 12/1989 | Williams | 340/712 |
| 5,077,552 | 12/1991 | Abbate | 340/825.25 |
| 5,262,940 | 11/1993 | Sussman | 364/403 |
| 5,282,028 | 1/1994 | Johnson et al. | 455/4.2 X |
| 5,410,326 | 4/1995 | Goldstein | 348/134 |

FOREIGN PATENT DOCUMENTS

| | | | |
|---|---|---|---|
| 0390041 | 10/1990 | European Pat. Off. | 345/146 |
| 0153484 | 9/1983 | Japan | 340/825.72 |
| 9103038 | 3/1991 | WIPO | 340/825.72 |

OTHER PUBLICATIONS

"Control Networks For The Home" by F. Gutzwiller, Machine Design vol. 55 (1983, Oct.) pp. 109–112, #24.

Primary Examiner—Robert J. Pascal
Assistant Examiner—Arnold Kinkead
Attorney, Agent, or Firm—Sandra M. Parker

[57] ABSTRACT

An improved audio-visual computer-based home entertainment media inventory and control system is disclosed comprising a computer with associated software, for controlling any combination or number of video tape record-playback units, audio tape record-playback units, video disc record or playback units, CD audio record or playback units, and the like, said system includes a touch-screen color video display for displaying computer or TV format graphics, inventory lists, and operational touch screen menus for ease of operator use in inventorying and accessing audio-visual recordings. This system includes hardware and software facilities for accessing electronic mail sources of media content information, graphics data and broadcast air time guides.

20 Claims, 11 Drawing Sheets

Fig. 7

```
              MAIN A-V SYSTEM MENU "ENTER MEDIA INVENTORY"

A-V ENTER MEDIA INVENTORY        CD                              SCROLL
                                                                    PAGE

A-V PRINT INVENTORY LABELS/LISTS    A- CASSETTE                  SCROLL
   A-V DEFINE SUBSCRIPTION SERVICE     V- CASSETTE                  LINE
   A-V DEFINE DYNAMIC AUDIO DISPLAY                                 SCROLL
   A-V DEFINE SYSTEM COMPONENTS                                     LINE
   A-V SELECT AUDIO DISPLAY
   A-V PLAY/RECORD                                                  SCROLL
                                                                    PAGE
```

| 1 | 2 | 3 | A | B | C | D | E | F | G | → |
| 4 | 5 | 6 | H | I | J | K | L | M | N | ← |
| 7 | 8 | 9 | 0 | P | Q | R | S | T | U | DEL |
| * | 0 | # | V | W | X | Y | Z | . | ? | ESCAPE |

Fig. 7a

```
              ENTER MEDIA DATA MENU                  MEDIA # - - - - - - -

MEDIA     MEDIA # - - - - - - -                                    SCROLL
DONE                                                               PAGE
          MANUFACTURER - - - - - -     ARRANGER - - - - - -
          MANUFACTURER # - - - - -     PRODUCER - - - - - -        SCROLL
S-KEY     MEDIA TITLE - - - - - -      PERFORMER 2 - - - - -       LINE
          PERFORMER 1 - - - - - -      PERFORMER 3 - - - - -
          CATEGORY - - - - - - - -    PERFORMER 4 - - - - -        SCROLL
          A/D,MASTER - MIXER - FINAL - PERFORMER 5 - - - - -       LINE
          RECORD DATE Y/M/D --/--/--  TRACK 1 (M/S --/--) TITLE - - -
          LOCATION - - - - - - - -                                 SCROLL
          CONDUCTOR - - - - - - -     TRACK 2 (M/S --/--) TITLE - - -  PAGE
```

| 1 | 2 | 3 | A | B | C | D | E | F | G | → |
| 4 | 5 | 6 | H | I | J | K | L | M | N | ← |
| 7 | 8 | 9 | 0 | P | Q | R | S | T | U | DEL |
| * | 0 | # | V | W | X | Y | Z | . | ? | ESCAPE |

Fig. 10

| MAIN A-V SYSTEM MENU "DEFINE DYNAMIC AUDIO DISPLAY" | | |
|---|---|---|
| A-V DEFINE DYNAMIC AUDIO DISPLAY | BAND ⋮ <br> 01 | BAND WIDTH <br> ----TO---- |
| A-V DEFINE SYSTEM COMPONENTS <br> A-V SELECT AUDIO DISPLAY <br> A-V PLAY/RECORD <br> A-V ENTER MEDIA INVENTORY <br> A-V PRINT INVENTORY LABEL/LISTS <br> A-V DEFINE SUBSCRIPTION SERVICE <br><br> NEW GRAPH # -    RECALL GRAPH # - | 02 <br> 03 <br> 04 <br> 05 <br> 06 <br> 07 <br> 08 <br> 09 <br> 10 <br> 11 <br> 12 <br> 13 <br> 14 <br> 15 <br> 16 | ----TO---- <br> ----TO---- <br> ----TO---- <br> ----TO---- <br> ----TO---- <br> ----TO---- <br> ----TO---- <br> ----TO---- <br> ----TO---- <br> ----TO---- <br> ----TO---- <br> ----TO---- <br> ----TO---- <br> ----TO---- <br> ----TO---- |

Side buttons: SCROLL PAGE ↑, SCROLL LINE ↑, SCROLL LINE ↓, SCROLL PAGE ↓, →, ←, DEL, ESCAPE

Fig. 11

| MAIN A-V SYSTEM MENU "DEFINE SYSTEMS COMPONENTS" | |
|---|---|
| A-V DEFINE SYSTEM COMPONENTS | CD CONTROLLER |
| A-V SELECT AUDIO DISPLAY <br> A-V PLAY/RECORD <br> A-V ENTER MEDIA INVENTORY <br> A-V PRINT INVENTORY LABEL/LISTS <br> A-V DEFINE SUBSCRIPTION SERVICE <br> A-V DEFINE DYNAMIC AUDIO DISPLAY | AUDIO CASSETTE CONTROLLER <br> VCR CONTROLLER <br> TV CONTROLLER <br> STEREO CONTROLLER <br> AMPLIFIER/SWITCHER CONTROLLER |

SCROLL/SELECT COMPONENT TO ACTIVATE IR REMOTE CONTROL CODES:

| CD, | MOTOROLA, | MODEL |
|---|---|---|
| CD | JVC | MODEL |
| CD | KENWOOD | MODEL |
| CD | MITSUBISHI | MODEL |
| CD | PIONEER | MODEL |
| CD | SONY | MODEL |

Side buttons: SCROLL PAGE ↑, SCROLL LINE ↑, SCROLL LINE ↓, SCROLL PAGE ↓, ESCAPE

AUDIO-VISUAL INVENTORY AND PLAY-BACK CONTROL SYSTEM

FIELD OF INVENTION

The present invention relates to home entertainment audio-visual control systems. More specifically, the present invention relates to a computer based home entertainment audio-visual control and inventory system which provides a user-friendly touch-screen interface enabling users to inventory recordings, browse or print inventory, and control audio-visual record/playback units with a facility not previously available. Its application extends to commercial studio use.

BACKGROUND OF THE INVENTION

In distant past years, the common home entertainment media used to record and play music was vinyl twelve and seven inch audio records, with limited play times of five to forty minutes, and audio cassette tapes with limited play times of sixty minutes. There was no ability to select and playback partial contents, as play was serial from start to finish. Control of the record-playback units was manual with simple function push buttons, and while several vinyl records could be stacked for play, they could be played only serially in their entirety. Cataloging, storing, organizing and selecting, referred to herein as Inventory Control, consisted of simply stacking records on a shelf so that the album titles could be read, or storing cassette tapes in a box so the labels could be read.

Various simple computer software database management programs have been available which permit computer keyboard entry and processing of data such as album names, track titles, and associated data such as performer names. These programs could perform in a simple inventory management manner such that once data was manually entered into the software, the data could be organized and sorted in user defined ways, and labels and or catalogs could be printed. A disadvantage of such a simple inventory control system is that it has no provision for computer based automated interaction with the recorder-player units or the user in scheduling and executing play-record operations. With this simple approach, the process of keeping the inventory data base updated, and of recording or playing audio or video media, was highly labor intensive, subject to error, and not electronically integrated in that the system does not control the record-playback units, nor provide for automatic unattended means of data base acquisition.

In more recent years there has been a proliferation in the types, quality and availability of recorded audio-visual media and their associated record-playback units. This media includes all types of analog and digital recording means on which audio and/or video data is recorded and played back. This media includes but is not limited to Compact Discs (CDs), small three inch by five inch analog audio cassettes, the DAT digital version of these tapes, the larger single reel analog tapes, analog vinyl records, video discs, TV type cassette tapes, and similar recording media such as the new DCC and MD format CDs. At the same time there has been a significant growth in the sophistication of the record-playback units in terms of remote control of unit features such as interconnect switching and operational function programming.

This phenomenal growth in the number of types, quality, sophistication and availability of the recorded audio-visual media, the record-playback units, and the remote hand-held controllers, has created an information and media management crisis for the average music and video lover who desires to store, retrieve, play and manage a large inventory of Compact Discs (CDs), video tapes, audio tapes, video discs and vinyl records. Additionally, digital format recording media have permitted several hours of high quality entertainment on one media such as a CD, making it a challenge to browse inventory, select a media and play selected portions. With the increased play time per media, and the growing capability of recorder-players to hold one or more cartridges, which in turn hold 6 or more media such as CDs or analog or digital cassette tapes, there has been an increased need for a user-friendly computer based inventory and control system. There are no present day home entertainment control systems to conveniently inventory medium to large album collections and control multiple playback units, with minimal operator skills required.

Home audio-visual equipment users are generally unsophisticated in their ability to understand and operate much of the new audio-visual equipment on the market, including the more complex hand held controllers. Industry sources say that up to twenty-five percent of newly purchased audio-visual equipment is returned because the owners found it too complicated to operate. The hand held controllers are becoming more sophisticated to the increasing discomfort to the average user. The recent introduction of the ability of a remote controller to accept universal codes to control VCRs has helped, as has another recent technology introduction in the remote controller being able to respond to spoken commands. These are limited however in their ability to solve the overall user interface problem.

There presently exists a need to create a computer based audio-visual inventory and control system which can effectively manage the increasing size of audio-visual collections and increasing sophistication of recording-playback systems, while providing the user with an exceptionally user friendly control interface. This interface would, in effect, hide sophisticated computer coding and controls from the computer illiterate user, and empower the user to enjoy and manage the system without technical intimidation.

Audio-visual industry standards have recently emerged which provide for the widespread use of wireless remote control Control-S Infra-Red (IR) beams for the media recorders-players, and the built-in capability of those units to recognize and address individual tracks or recordings. Owners of audio-visual systems frequently have several different hand-held IR remote controllers in a multiple playback-record unit system. Most audio-visual components such as television sets (TVs), video tape recorder-playback cassette recorder units (VCRs), laser video disc players, compact disc (CD) record-playback units, audio cassette record-playback units, AM/FM tuners, amplifiers and interconnect switch boxes are now available with the industry standard Control-S IR wireless remote control protocol, and can be controlled with a now familiar IR remote controller. This is normally used to allow a user to command the recorder-playback units to perform certain functions one at a time, or store a limited list of functions or selections and perform them over some time interval.

Existing technology permits a hand held universal controller to be preprogrammed with a set of control codes for most sophisticated audio-visual components, and such a controller can be used with a particular set of components simply by selecting the control options required. While this simplifies the training of the controller for a set of equipment, it is still awkward for the average person to use, and is only a partial solution to the overall inventory management and control problem.

Television and AM/FM broadcast or air time guides are published regularly in everything from individual station air time guides, to specialized publications like TV Guide, and daily newspapers. From these, an audio-visual system user may make manual entries to effect play or record of selected programs. Hand-held remote controllers are available which permit a single universal code to be entered to automatically set the channel number and record start/stop times, using the universal code published in newspaper and magazine guides. There is no provision however for subscription to a conventional mail or electronic mail of digital TV or AM/FM listing data base, and computer assisted browsing and selection of programs for play or record.

At the present time, home audio-visual record-playback units have no provision to communicate back to the remote hand held controller or to an audio-visual computer controller. The communication path is uni-directional in that the record-playback units only receive IR information from the remote controller, but do not transmit information back to the remote controllers, and the IR remote controllers only send information to the record-playback units but do not receive information back from the record-playback units. The present day audio-visual record-playback units can not communicate bi-directionally. Thus the record-playback units can not transmit information to the controller which the controller could then act upon or otherwise display feed back information to the user or to automatically control the operation of the record-playback units. The uni-directional IR transmission path disadvantageously limits the interaction between record-playback units and the controller.

High resolution color Cathode Ray Tube (CRT) monitors, and newer flat panel displays, are now able to provide text and graphic computer displays, and equally important, to function in a touch- screen mode and support a graphic image TV format display mode. The touch screen mode and high quality graphics display has been used in non-audio-visual control systems to provide simple, easily understood software interface through which the user interacts comfortably with the computer screen menu, and the operator requires little or no computer training. Disadvantageously, present day home entertainment audio-visual record-playback controllers do not incorporate the advances of high resolution touch-screen mode technology for the convenience of the unsophisticated user.

Existing integrated audio-visual database and control systems have not been adapted for electronic access to album color graphics and media titles and track listings. While electronic image scanners are available and could be used by the audio-visual system user to scan album covers and track information into the computer to generate data base for inventory, control and display, such scanners are relatively expensive and require operator expertise. However, electronic mail is now common place. Low cost communication modems connected between home computers and a phone line can perform automatic unattended call and answer and communication with other computers.

Present day home entertainment systems do not store and display album graphics, or media and track information. Existing IR contoilers and audio-visual inventory database systems have not been adapted to receive mailed computer readable data storage discs or digital transmissions through a modem into an audio-visual control system computer enabling the user to request, receive and readily use album color graphic images and album title and track information. When received, this information could be automatically integrated into the data base and made available for browse and display, which would reduce the need for A-V System users to key in all of the media content information.

Existing A-V control systems have not been adapted with programmed inventory and control capabilities to provide a convenient means of inventory control and control of audio-visual play/record for home entertainment which system would take advantage of the low cost of computer equipment which has continued to decrease over the past decade. The prior art systems do not provide for low cost audio-visual inventory and control home entertainment computer system which must meet the requirement of being user-friendly with minimal education or training required on the part of the user. Such capabilities should relieve the user of much of the audio-visual media inventory data acquisition, management, search and selection burden. Such capabilites should make maximum use of the Control-S IR protocol for communication with audio-visual components, and should offer application extensions that include subscription for and electronic acquisition and integration of AM/FM radio and TV program listings, media title and track content listings, and digital "album cover" color images, by digital computer disc or electronic mail, so that listings can be browsed, selections made, and play-record sessions scheduled to take place automatically. These and other disadvantages and limitations of the existing home IR controllers and inventory database systems are solved and reduced by the present invention.

SUMMARY OF THE INVENTION

An object of the present invention is to provide an improved user-friendly computer-based audio-visual entertainment media inventory and control system.

Another object of the invention is to provide an inventory and control system which has a touch-screen format for user-friendly software control of audio-visual media players-recorders, and management of the associated media inventory.

Yet another object of the invention is to provide an improved user-friendly computer-based audio-visual entertainment media control system which can be programmed to emulate a plurality of hand-held controllers, like a universal controller, but whose control functions are implemented via embedded system software, using easily operated touch screen displays.

Still another object of the present invention is to provide a media inventory and control system which keeps track of all media and their content, and permits inventory browsing and selection.

Still another object of the present invention is to provide an inventory and control system with the ability to search, and display or print media catalogs and inventory based upon user specified content criteria such as performer name or type of music.

Another object of the present invention is to provide an inventory and control system which incorporates conventional magnetic or optical recorded digital or analog audio and video information, or electronic mail information from subscription services for TV and AM/FM program listings, audio-visual media title and track listings, and album or jacket graphic images for display.

Yet another object of the present invention is to provide an inventory and control system which provides user-customized dynamic graphic visual displays representing audio band energy. These dynamic audio-driven displays can be selected for display to accompany the audio playback.

Another object of the invention is to permit the operator utmost flexibility in specifying the media groupings and play requirements, and remembering them to permit easy repeat at a future time.

Another object of the invention is to permit simple operator definition of scheduled play times and programs, with ease of repeat, such as certain wake up music every morning.

Another object of the present invention is to provide an inventory and control system which may be placed in conveniently remote locations from the audio-visual units themselves.

Another object of the present invention is to extend the flexibility of Compact Disc track play options (random, sequential or programmed) to other media such as the audio cassette tape and the video cassette tape. The latter is now a preferred media for audio only recording because of its superior performance compared to audio cassette.

Still another object of the present invention is to permit the user to predefine groupings and play requirements of media such as particular CDs in a cartridge. Once these are defined and stored with the names and play criteria, they may be recalled for play without redefinition of requirements.

Another object of the invention is to extend the media play options to include multiple play, or no play, of selected tracks, and to remember that and other user play specifications on subsequent use of the same media, until changed by the user. Current play-record components lack the capability to remember and reuse user specifications.

Another object of the present invention is to provide an audio-visual inventory and control system that keeps track of the usage of recording media in the system, such as blank audio cassette tapes or video cassette tape. When each new blank tape is introduced into the system it is given an identification number and its record updated each time it is recorded on. This permits the computer to warn a user that not enough recording time is left for a requested recording. This information is also printed on labels for the media after a recording session.

Still another object of the present invention is to keep track of the play times for tracks on each media. These will be loaded with the media data when the media data subscription service is used. Alternatively the system will calculate and keep track of the track play times the first time the media is played. This information is used by the computer to calculate if there is enough space left on a media for a requested additional recording.

Another feature of the invention is that as media and tracks are selected for play, the computer will calculate and display cumulative play time, or remaining play time, based upon its knowledge of all track durations, and of the current play status.

Another object of the invention is to permit the system user to call up inventory by content, as well as by media number. In this case the user would specify a key word or phrase to be used as a search key. Any record in the inventory that includes the key, will be identified and scrolled on the screen for review. This mode applies to media and track titles and to TV/AM/FM listings. In the TV case the user could make "NFL" a search key to have the channels, times, and dates automatically displayed for review. Selection by touching the screen is automatically set the TV, VCR, or AM/FM operation without further effort or data entry by the user.

The present invention encompasses an improved computer-based audio-visual entertainment media inventory and control system which exploits recent advances in computer graphics display hardware and software, exploits the proliferation of IR remotely controlled audio-visual components such as Compact Disc (CD) players, Television sets (TVs), Video Cassette Recorders (VCRs), and audio cassette recorder-players, and exploits the management problem associated with the availability of large quantities of audio-visual media, including discs and tapes, in order to provide an integrated user-friendly audio-visual control system to inventory and control audio-visual record-playback units and inventory data base. This improved system is ideal for but not limited to the home environment. The present invention includes bi-directional IR control of the audio-visual system and anticipates that future versions of record-playback units will incorporate an IR Control-C transmit capability to output controller and media status, and media title/track information which can be directly utilized by the A-V system described herein. The present invention takes advantage of standard Control-S infrared protocol for two-way communication between the computer and the audio-visual components, making additional system cables unnecessary.

The present invention solves and reduces the prior art disadvantages of the universal controller by using a smart, interactive software controlled touch-screen display. This eliminates the need for an array of all possible control buttons, since only those options relevant at any moment are displayed. The use of a variety of colors, and blinking cursor prompts to the user, further simplify the operator's task. The software menus and associated touch-screen display lead the user through the selection of control options.

The present invention provides interactive menus displayed on the color graphics touch screen. The user will be familiar with the technology through similar touch screen used for bridal registries in department stores, lotto ticket sales, and personalized greeting card shops. These audio-visual menus are designed to make it easy for a computer illiterate audio-visual system owner to set up inventory, manage and enjoy an audio-visual system, and take advantage of new related services such as electronic mail. By virtue of this software-driven touch pad operator control approach, this invention anticipates that a left-handed user might specify that the displayed Scroll touch pads normally in a fixed location on the upper right side of the color display screen, be relocated to the left side. This invention also anticipates that users with certain types of color blindness such as red-green or blue-green would want to specify their own colors for use in differentiating areas of the display. These personalization changes are easily supported by the software design.

The present invention makes use of an automatic, software controlled communications modem to allow the user to: i) subscribe to and receive electronic sources of AM/FM and TV listings; and ii) order and receive album graphics images and media-track titles associated with newly purchased media. These latter features greatly reduce the need for the user to enter data into the data base since he will only need to enter the ten to fourteen digit identification code number printed on the album jacket of a new media. Once acquired, the media content listings would be stored in the media data base and be available for browsing, catalog printing or selection for play, and the album color graphics images would be stored and made available for display on the color monitor of the computer with or without the media and track titles. The AM/FM and TV listing data are stored in the integrated data base by the system software data base manager, and made available for browsing on the screen. Selection of a broadcast program while browsing inventory listings on a screen, can automatically command a play or record operation with no other data entry required by the user.

The present invention include computer programs, a disc drive and modem for receiving mailed computer readable data storage discs or mailed digital transmissions so that the audio-visual control system computer can receive album color graphic images and album title and track information. When received, this graphic information is integrated into the data base and made available for browse and display. This will reduce the need for A-V System users to key in all of the media content information, and make available the display of graphic information. The A-V system described in this invention includes the option of displaying the album color graphic and or track titles during play, thereby turning an audio experience into an enjoyable audio-visual one. The software design of this invention includes an integrated data base capability which supports automatic and unattended acquisition, storage, management and display of high resolution graphics (color or black/white), media content text data, and TV, FM, and AM air time program listings. The automatic reception of digital TV and AM/FM listing database information for computer assisted browsing and selection of programs for play or record. The listing information can be loaded either through disc read on a disc drive, or by electronics transmission through a modem.

The audio-visual system software of the present invention supports future audio-visual media features such as media and track content listings, and/or the album graphic, encoded on the CD itself, for direct retrieval, storage, management and display by the inventory control system. This media title and track title information might also include but not be limited to track play times, names of performers, conductor, arranger, and recording locations and dates.

The audio-visual system software design of the present invention also anticipates that a short segment of the media in a fixed location and appropriately identified, may include an audio introduction to the media and/or each track. This could be names of performers, historical information or any information the media producers thought useful. This introductory data can be enabled or disabled on the software menus made available to the users.

Using the software-driven interactive touch-screen displays, the user easily performs all of the necessary functions which include: i) set up media play-record options and times, ii) enter new media acquisition data into the data base, iii) print media labels or catalogs, iv) set up unattended subscription service via either electronic or conventional mail, v) define a set of dynamic audio frequency graphs for display during media play, vi) define system components model number and manufacturer name, to enable automatic selection of infrared control codes, and vii) select the display options to be displayed during audio play.

The present invention will use color to make long displayed sequences of digits more readable and to prevent mistakes often made with them. In numbers of more than three digits or more than three of a combination of letters and digits, every other set of three will be displayed in yellow, with the intervening three displayed in white.

The present invention requires a standard personal type computer with added plug-in electronic modules and software. This audio-visual control computer also can function as a standard home personal computer, and thereby be used for other functions as well, thereby amortizing the investment cost over multiple applications, unlike a dedicated audio-visual control computer. Other such functions might include: lighting and appliance control, security control, word processing, check book accounting, and other business and home applications.

The present invention includes an electronic unit that connects to the audio amplifier outputs and encodes audio information for transmission to the audio-visual control computer over an IR Control-C link. This unit constantly measures the audio energy in sixteen equal frequency bands and transmits that digital information to the computer. In the computer, the information is used both to detect the gaps between tracks, and to support user defined multi-colored dynamic visual graphics displays which are a representation of the audio frequency versus intensity information, and which can be displayed on the computer monitor during audio play.

The present invention includes provision on the computer chassis for IR transceiver with a raised antenna has omni-directional receive and transmit. This permits a great deal of flexibility in the placement of the computer relative to the audio-visual components in a room, as long as they have good line-of-sight alignment.

The present invention is optionally adapted for remote computer control of the audio-visual units from a remote positioned computer (located in another room) having its IR communication blocked. An IR transceiver repeater electronic unit is available on the market which can provide the necessary line of sight, or IR/RF adapters are available which permit the conversion of IR energy to RF energy for transmission through walls, and then back to IR energy for interface to the audio-visual component and to the computer. These and other advantages will become more apparent to those skilled in the art form the following teachings of the preferred embodiment of the present invention.

This invention also anticipates that the source for TV or radio program listing information that would be used by this new A-V System, as described herein, might be via an interconnect to one of the Interactive TV Services being planned by companies such as Interactive Network, ICTV, Videoway, Time-Warner Cable, United Video, Insight Telecast, and Liberty Media. Interactive TV services are currently planned by these and other TV, Telephone, Cable TV and other suppliers. Each of these services supplies a small two-way controller with simple display and keyboard, as well as television programming for TV Set display. These controllers permit the user to request and scroll menus on the TV Screen, and to make selections of data such as TV program listings, and permit selection of current of future programs for either display or for automatic VCR recording. This invention anticipates that a hard wired or IR Control-C interface could be made between the Interactive TV controller and this A-V Control System, which would provide request for and receipt of program listing information such as for TV and AM/FM broadcasts.

Figure 3:
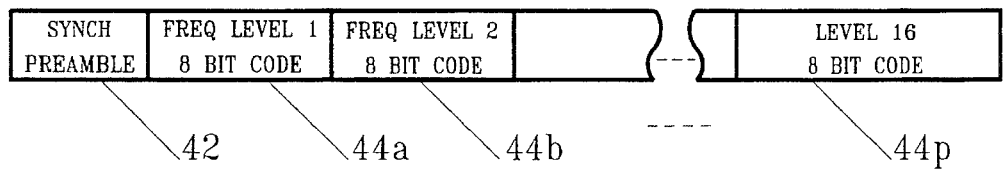

FIG. 3 depicts encoded volume message including sixteen audio frequency bands associated with the encoding and transmission of multi-band audio energy information to the audio-visual control computer.

Figure 4:
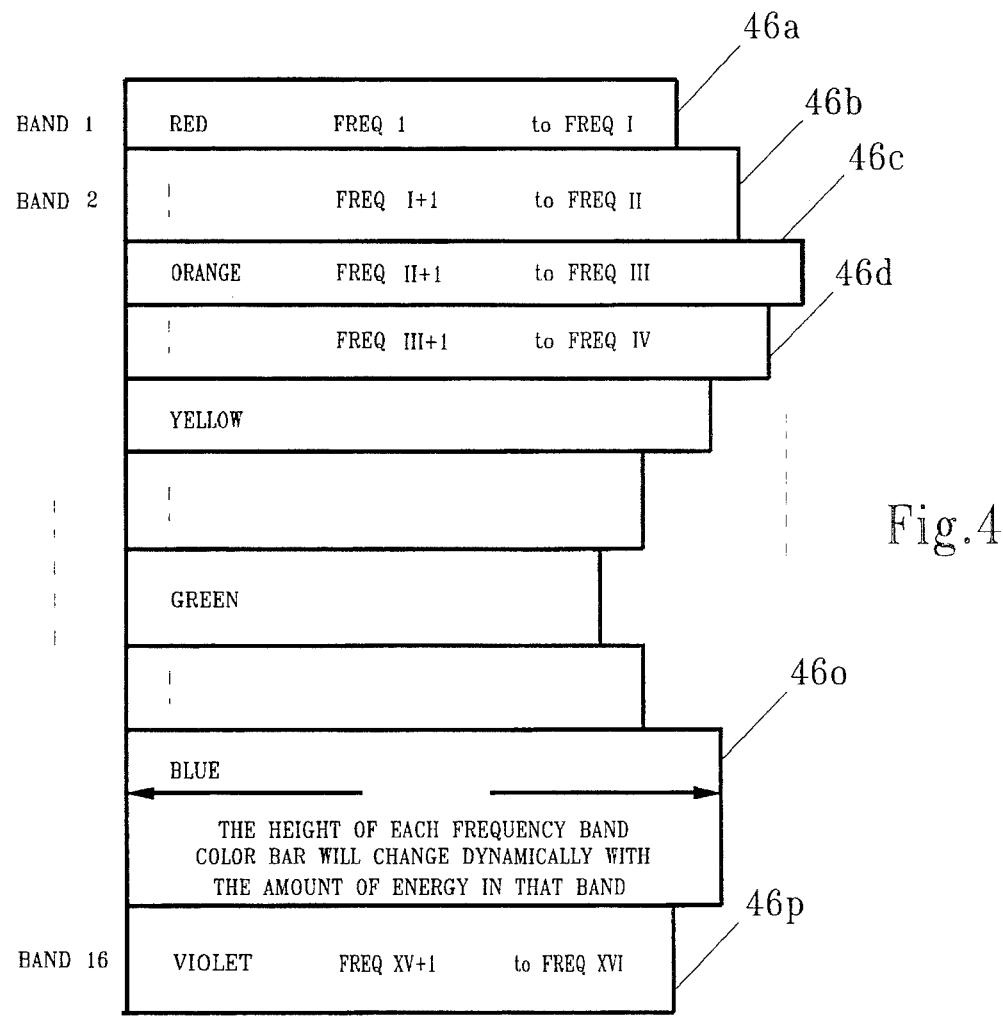

FIG. 4 depicts the display and organization of audio frequency information into 16 frequency bands. Each of which is represented as a bar and will be displayed as a different color. In the preferred embodiment the colors of the rainbow will be used, where the lowest band will be red, through the highest band which will be violet. The height of each band or energy bar, will represent the instantaneous energy in that band.

Figure 5:
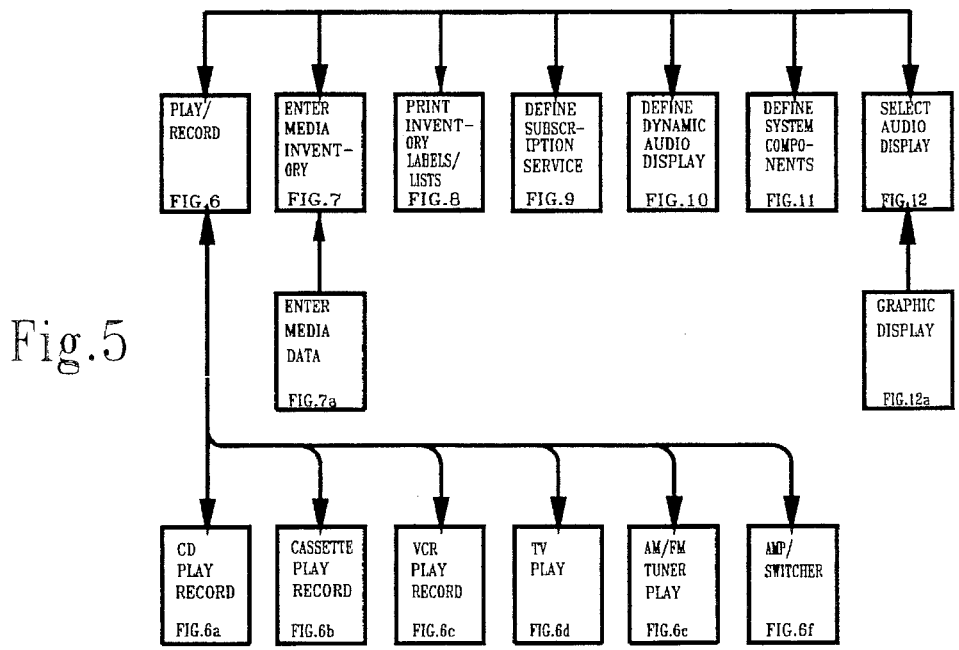

FIG. 5 is a block diagram of the menu flow for the audio-visual computer software to be used by the operator in interacting with the system via the color touch screen display.

Figure 6:
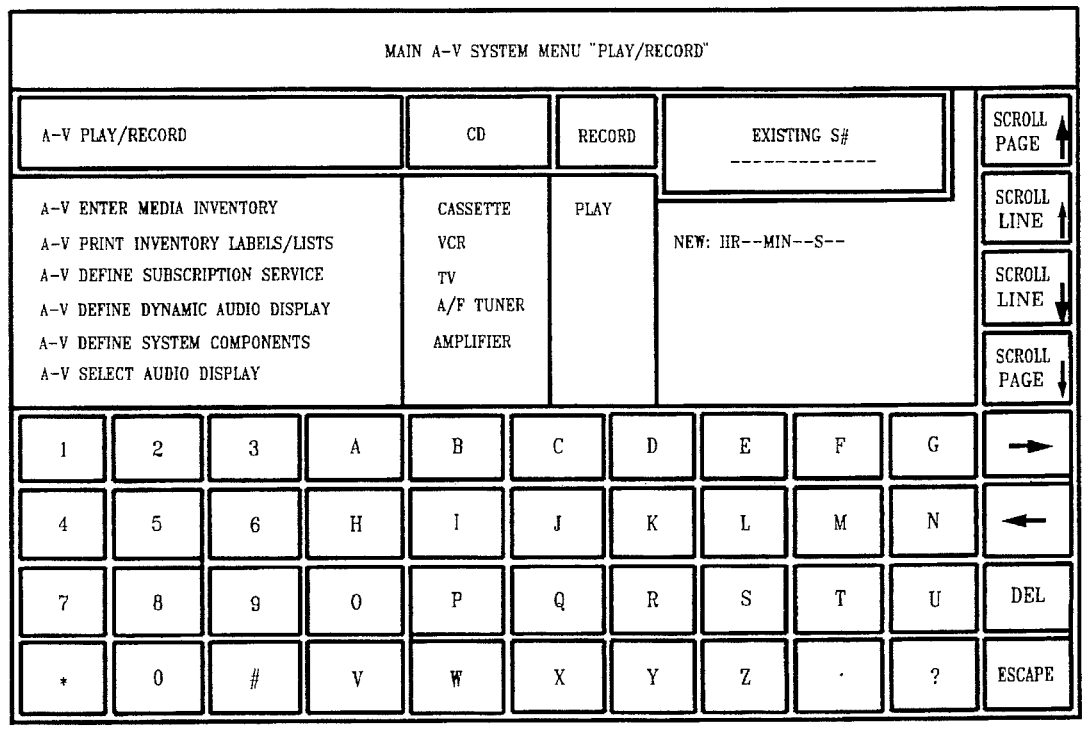

FIGS. 6, 6(a–f), 7, 7a, 8, 9, 10, 11, 12, 12a depict a two-level menu through which the operator interacts with the hardware and software of the audio-visual control system.

DETAILED DESCRIPTION OF THE PREFERRED EMBODIMENT

An audio-visual computer is adapted to control a variable number of audio-visual record-playback units, audio amplifiers, and interconnect switchers. The record-playback units (not shown) can include video tape record and/or playback, audio tape record and/or playback, digital tape record and/or playback, Compact Disc (CD) record and/or playback including the new DCC and MD formats, and can be modified to operate with any other IR remote controlled audio-visual unit such as for example a video disc record and/or playback. The audio-visual computer of the preferred embodiment includes a power supply, processor such as an Intel 386 with associated solid state memory and input/output capability, memory hard disc drive and controller, modem, IR transceiver module, an remote audio decoder synthesizer/transmitter module, and an optional integrated communications modem module, (not shown), and a floppy disc drive, touch screen control module and bezel with a high resolution color graphics display including its associated controller.

Other modules may be added to expand or improve performance. These modules are typically single board electronic card units which plug into an associated position in the computer chassis, as is common in the art. The chassis typically includes a mother board or back plane for power and signal routing between the various modules. The chassis also includes connector provision for display monitor, phone line, page printer, label printer, and touch bezel interface. When installed, the modem may be initialized through the software to order and receive information from listing services for AM/FM and TV broadcasts, and for ordered media album graphics and media track content information. A computer chassis encloses normal home computer electronics modules, in addition to new modules for the audio-visual control and monitor function;

The touch screen bezel on the color monitor permits the software to present option menus to the user for touch activation, and display of inventory data to the user for viewing and selection. Another optional component is a commercially available voice encoder and synthesizer to permit the user to record and implement personalized album and track introductions automatically during media play.

Figure 1:
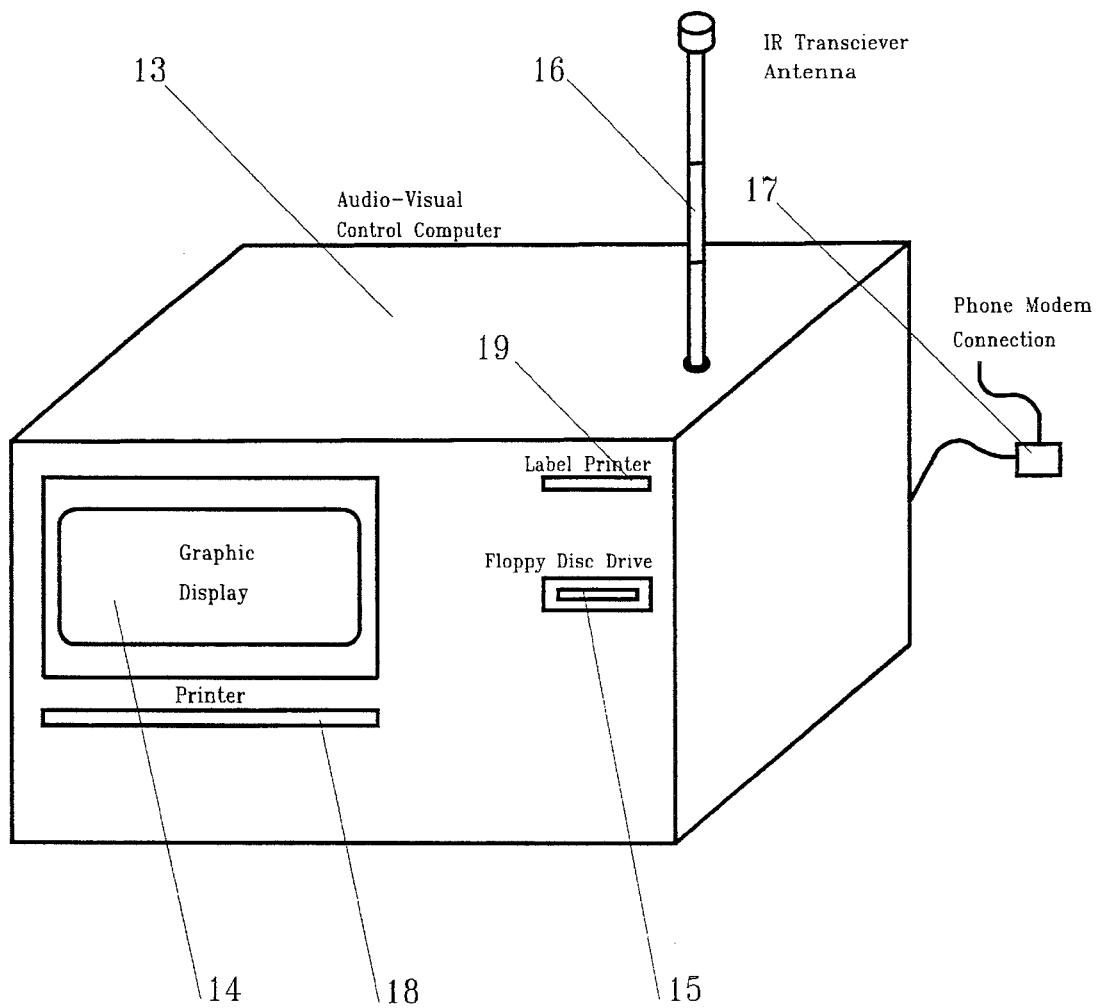
FIG. 1 depicts the audio-visual control computer, having a hard disc drive, an optional floppy disc drive, a label printer, a page printer, a touch screen display, an IR transceiver with antenna, and a RJ11 phone jack for modem connection to a phone line.

Referring to FIG. 1, an audio-visual computer 13 and its interfaces is shown. The basic interface elements include: a high resolution color graphics display with an attached bezel around the edge to detect user touch position on the display 14; one or more disc drive slots 15 for insertion of removable type data storage discs; IR transceiver with omni-directional antenna 16 for two-way wireless communication with and control of audio-visual components; a phone line interconnect 17 for modem use for of electronic mailing; and, a standard page printer 18 for printing user-specified media catalogs; a smaller label printer 19 for printing stick-on labels for newly recorded blank media such as VCR and Audio cassettes.

The computer 13 would normally have an integral internal hard disk memory drive of about fifty megabyte capacity in the preferred embodiment, and an IR encoder transmitter to be connected to the audio-visual system speaker inputs, for encoding and transmitting a repeating signal representing the audio signal energy in each of sixteen frequency bands. The latter signal is used by the computer software to detect inter-track gaps, and to support the user definition of dynamic audio graphic images to be displayed on the monitor during audio play. This invention anticipates that at such time as media suppliers encode media and track labels, or introductory or background information in a dedicated location on the media, that information would be automatically retrieved and used by the audio-visual computer 13.

The user-friendly interface required for this audio-visual computer is implemented using a touch-screen capability implemented on a computer graphics display 14. This display monitor could be lower resolution and black and white but in the preferred embodiment, for optimal user utility, the display would be a minimum fourteen inch diameter, VGA resolution or better, and provide color. The touch screen capability permits the computer software to display user options and drawn touch pads, so that when a user touches the screen, the software can detect if a user selection has been made and which one. Since these touch pads are software generated and displayed, the software is able to keep the display uncluttered, with only currently required text and touch pads displayed. User interface is further enhanced through the software use of colors, blinking cursors and prompt messages on the display. The design of these software generated displays is a key element of this invention. Another technique used extensively is that of using multiple vertical information columns in a scroll mode. The scroll technique provides access to large amounts of information in each column, but only the selections are displayed at any one time, so that as user selections and decisions are made on a screen, other previously made related decisions are still displayed for review, but with minimal screen clutter.

Several technologies exist for implementation of touch screens which enable the computer to detect when and where the operator touches the screen. These different techniques differ in the precision with which the location of the touch can be detected, how rugged the equipment is, how sensitive the equipment is to moisture or skin oil, and how sensitive the equipment is to drift requiring re-calibration. The preferred embodiment is represented by example of a touch screen unit produced by Carol Touch Division of AMP Incorporated. This unit relies on the interruption of an Infra-red light field that is positioned directly on the front of the computer display screen, using an opto-matrix around the periphery of the display surface. The opto-matrix frame is composed of infrared light-emitting diodes (LEDs), and photo-transistor light detectors. The LEDs are arranged along two adjacent sides, that is the top and left side, while the detectors are placed along the other two sides of the frame opposite the LEDs, with the light beams just off the surface of the display. When the user's finger penetrates or interrupts this IR grid, a touch is detected by the associated beam detectors and decode electronics, and the location is encoded and sent to the computer. The software can then associate the touch location with a particular displayed selection option. Any ambiguity such as that resulting from the user touching the screen between two adjacent displayed touch areas or on a non- touch pad, will result in the computer seeing two pads or no touch pads being touched. The software would cause an auditory beep and a displayed retry message would permit correction. This touch screen design can interface electrically with the computer via an Electronic Industries Association EIA RS232A standard interface as the preferred embodiment, or via a direct interface to the computer bus.

Another option anticipated by the present invention is the provision for one of several available voice output synthesizer controllers on the computer, which would be used by the software to supplement the visual and tactile operator interface with audio prompting of functions to be performed or repeated. Scientific research has shown that the same information presented to two human senses, such as both sight and sound, provides much more than double the comprehension, thereby extending the utility of the system to a greater range of possible users. An extension of this option would provide an audio input encoder, storage and synthesizer capability such that the user could prepare and store audio background and introductory data for media, which data would be reconstructed and played with play of the associated media.

Figure 2:
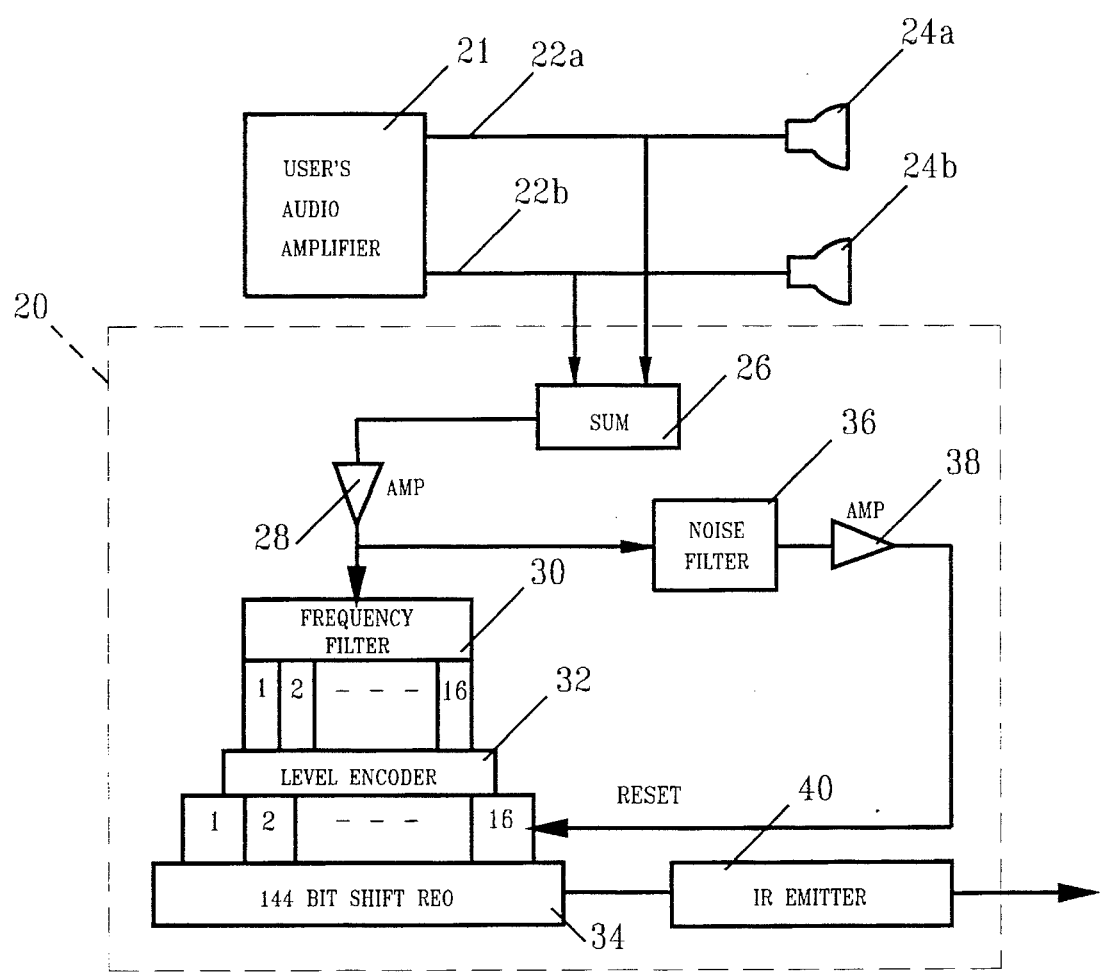
FIG. 2 is a block diagram of a remote audio encoder which monitors the audio amplifier output signal to the system speakers. It measures the audio energy in each of 16 different frequency bands, encodes that information, and transmits an IR encoded message to the audio-visual control computer IR transceiver with antenna.

Referring to FIG. 2, a functional block diagram is shown of an audio IR encoding unit 20. The diagram shows the user's main audio amplifier 21 having user's audio outputs 22a and 22b, at the point where they drive the user's main playback speakers 24a and 24b. The audio encoding unit 20 detects the audio levels on outputs 22a and 22b, using the summer 26 and amplifier 28 to encode the levels for each of a plurality of frequency bands, for example, sixteen frequency bands are used in the preferred embodiment. Each of the frequency bands are isolated and detected by a frequency filter 30. The amplitude level for each frequency band is encoded into eight bits by a level encoder 32. In the preferred embodiment, eight bits are used, but could be more or less. The eight bits of level data for each band is loaded and a 16 bit synch code is periodically loaded into a one hunderd and forty-four bit shift register 34. A noise filter 36 and an amplifier 38 are used to reset the level encoder during time of low amplitude levels. Each message transmitted by the IR encoding unit 20 consists of one hundred and forty four bits of digital data. The audio IR encoding unit 20 transmits encoded data to the audio-visual computer system via an IR Control-C link, using the IR Emitter 40. The encoded audio volume data emitted by the emitter 40 is used by the software of the audio-visual computer 13 to create a variety of stimulating or relaxing dynamic color graphics for viewing while listening to audio play. The signal level is also monitored by the software to detect end-of-track on media.

Referring to FIG. 3, each encoded volume message includes the sixteen different audio frequency bands which are encoded from the audio signal many times per second and sent to the computer over the IR link, each quantified to an eight bit resolution. This preferred embodiment of the invention anticipates that fewer or more bands may be used and that fewer or more than eight bits may be used to encode each band. Each block of such data is preceded by a synch code 42 of sixteen bits whose function in the preferred embodiment of this invention is to mark the beginning of each block of data transmission. The synch code is followed by the sixteen frequency level codes 44a through 44p.

Referring to FIG. 4, the encoded volume levels of the sixteen bands are displayed in one of several modes in which the computer software can convert the audio volume and frequency data to a dynamic color display on the computer monitor, thereby permitting a visual display during audio play. In the preferred embodiment display format for the invention, the frequency bands 46a through 46p are each one hundred and twenty five Hertz wide, and sixteen of them cover the frequency range of approximately zero to approximately two kilo Hertz. Each of the frequency bands 46 is represented by one segment of the visible color band of red through violet in the color spectrum, where a different color or hue will identify each of the sixteen different frequency bands. The width or amplitude within a particular color band is a function of the instantaneous audio volume or energy contained within that band as measured at the system audio amplifier, encoded and transmitted to the A-V computer. Other means of presenting this information are anticipated in this patent, such as having the bars presented vertically instead of horizontally, in which case the volume of a band is measured by the instantaneous height of a color bar. The default setting for this graph is that all sixteen bands are presented with equal width. The user may use the menu of FIG. 10 to number a new display and modify the settings to create and store up to nine different ones in addition to the basic one. This permits the user to have different settings appropriate for different types of music where different frequencies and sound volumes are prevalent. These modifications can include: combining bands to get larger color bars, elimination of some bands, and deleting some colors.

FIG. 5 is an overview of the computer menu screens that the audio-visual computer system user will use to set up the system audio-visual record-playback unit remote control, enter inventory, command record-playback, define audio graphic displays, print labels and catalogs, subscribe to electronic mail services and receive data, and select from multiple display options during audio play. The first level of these main menu modes are shown in FIG. 6 through 12, as are the sub-menus of the preferred embodiment of this invention. FIGS. 6a, 6b, 6c, 6d, 6e, 6f, 7a, and 12a depict the sub-menu displays of FIGS. 6, 7 and 12, respectively. The present invention anticipates that menus may be modified or more menus may be added as commercially available audio-visual recorder-player component technology and features change, such as new component switch boxes or added remote control features in the record-playback units.

FIGS. 6 through 12 depict the preferred embodiment of menus through which the user, using the touch screen is prompted by the computer software to initiate the various audio-visual control system functions. There are four basic techniques utilized on these displays to keep the screens uncluttered, easy to use, minimize operator error, and at the same time provide the user with a sense of always knowing where he is in a process. The first is to show on the screen only those things relevant to the current operation. This is easily done with the touch screen where only relevant decision touch pads are displayed by the software for user control. The second involves the extensive use of scrolling in vertical columns. The four scroll control keys in the upper right screen corner are used to cause a selected column of data to scroll vertically up or down for viewing and selection. They are easy for the operator to control since his finger is guided by the edge of the screen bezel. The vertical data scroll columns on the various menus are generally displayed at the top of the screen and contain from as few as two, to dozens of options in the scroll list. The commonality of all screens is maximized to facilitate learning and retention. The main column touch pads have either a green background for the one active column, or red for the inactive ones. The user is prompted to start with the left most column which the software will turn green when the menu first comes up, with the others red. As the user scrolls a selection into the select pad window, touching that pad will cause it to turn red, locking the selection, and the next will turn green. At any time, the user may change the sequence by touching a red one to cause it to turn green, thus permitting corrections or changes to be made. Only one of several vertical scroll columns is active at a time, and each can provide a window access to large amounts of data, with only the selected options shown. These selections remain on the screen for reference when other columns are scrolled, keeping the "big picture" in view. In the very few situations where the user must enter data, using a touch pad keyboard which is only displayed in that case, he is prompted by a blinking cursor. The system software makes operation of the system easy in other ways also, such as the way the software keeps track of all media including the remaining footage on all new blank audio cassettes and VCR cassettes, so that a software generated warning will prevent attempting to record more on a cassette that there is space available.

Figure 12:
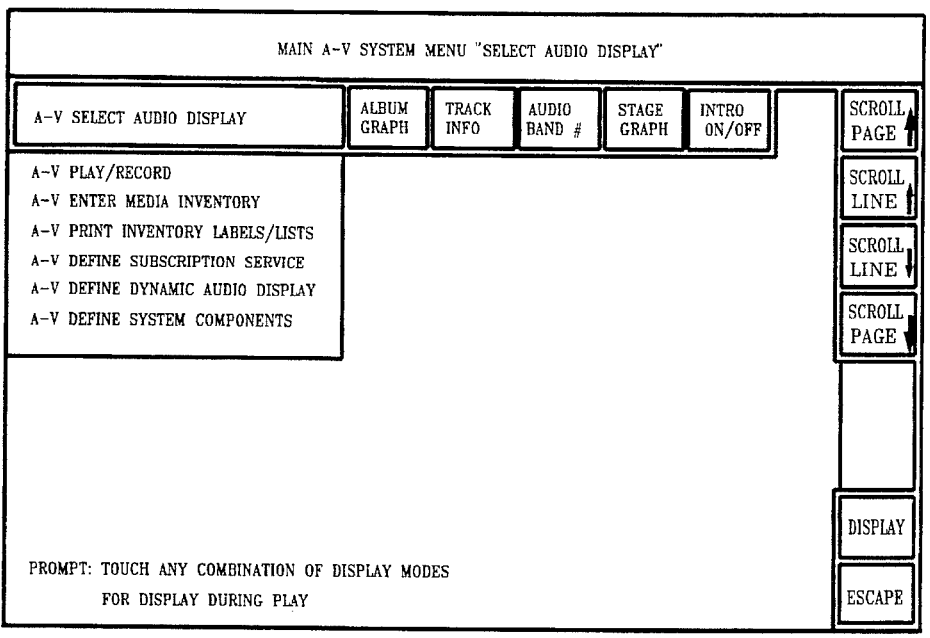
Figure 12A:
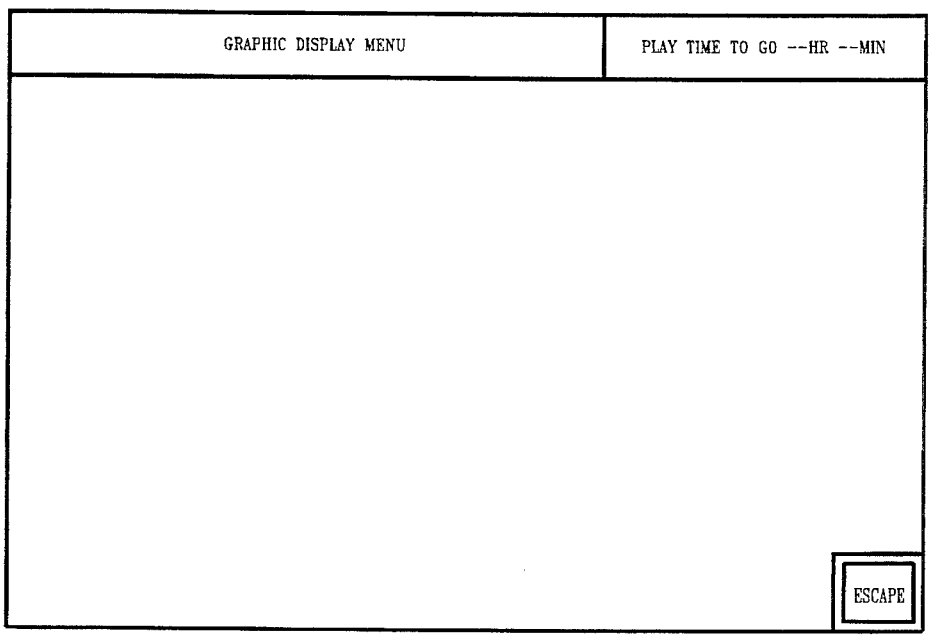

The four SCROLL control touch pads are used on all menus, except FIG. 12a, to scroll the contents of active (green background) vertical columns on the screen. The placement (upper right side of the screen) and implementation of these pads is unique in that using one finger and sliding it up or down while guiding it against the edge of the screen bezel, the user can easily control the scroll process direction and speed, while his attention is directed to the scroll option lines. Of the four scroll buttons, the two inner ones are used for slow scroll up or down, and the two outer ones are used for faster scroll up or down. In either case, touching a scroll key for longer than a second will cause a faster scroll. Holding the finger on the middle of the two inner scroll pads will halt scroll, as will removing the finger. This format is easy to use and learn, and requires minimal or no eye attention by the operator. A desirable option of the system is to permit the user to select a left handed or right handed placement of the scroll keys. Since all operator keys are software generated and controlled, this invention anticipates that a system software setup option would allow the user to move the SCROLL keys between the left and right sides of the screen. This invention also anticipates that the software will provide support for user selection of colors other than the standard ones described herein. This is an assistance to a significant portion of the population which has one or more of several forms of color perception or blindness.

The software design provides a menu hierarchy that is never more than two deep, meaning that in any system mode, the user can accomplish everything required from either the first level of a main menu or a an associated sub-menu. This obviates a learning problem common to many multiple depth nested menu systems where the operator loses perception of where he is.

The touch pad display screen is used by the operator to interact with the audio-visual control and inventory system. Touch pads are software drawn and labeled areas on the screen, which when touched, permit the computer software to determine what function is to be performed, including audio-visual system control, inventory functions, as well as other expected A-V industry services which will become available to the user. The different screen menus shown in the FIGS. 6 through 12 have a commonality of layout and terminology that facilitates their utilization. Referring to the FIGS. 6, 7, 8, 9, 10, 11 and 12, each main menu screen display has one or more function touch pads across the top, four SCROLL command pads on the upper left, a move LEFT arrow, move RIGHT arrow, DEL function and an ESCAPE pad along the lower right side of the screen. When operator data entry is required, the software will show a blinking cursor to mark the beginning position where data entry is to start. As the user keys in data, the cursor will move to the next position. If a correction must be made, the operator can use the LEFT or RIGHT arrow touch pads to move the cursor and over type previously entered data. The DELETE touch pad may be used to delete an entry at a blinking cursor without an over type. Where a fixed number of numbers or symbols must be entered, the cursor will stop at the last position, and there will be an audible error beep as the user attempts to key in more data than required. On free-form fields such as those for user specification of file search and retrieval criteria, the operator will indicate completion of key-in by touching the relevant column touch pad. This will cause the pad to turn red, and will initiate the next computer action. The ESCAPE pad is used to exit from this menu back to the associated first level menu or to the main menu of FIG. 6.

The common format used for displayed selection options is to display a set of vertical columns, where each column has a touch pad at the top of the column. Normally only one of the column touch pads will be active at a time, indicated by a green background under the column title or scrolled option, while the other column touch pad backgrounds have a red background. The scroll keys are used to scroll column options lists, up or down, through the green background column touch pad. When the desired column option has been scrolled vertically and is displayed in the green touch pad, touching that green background touch pad will change it to red and lock that option while it remains displayed, and turn the next column touch pad to the right, green. The computer software will support this data entry by guiding operation from the left-most column through the columns to the right, starting with a green touch pad background on the left-most column. The user may change this order, such as to correct a previous selection, by touching a red touch pad, causing it to turn green and the previous to turn red. In those few cases where the operator is required to enter alpha or numeric information such as: the serial number of a VCR cassette, a TV broadcast channel number, or an inventory search key, a blinking cursor will guide the operator in the data entry, moving through the available alpha numeric positions, as the operator enters symbols, until the entry is complete. When selections have been made in all columns, and the last green touch pad has been touched to turn it red, the computer will consider the set of selections to be complete.

The need for the user to enter alpha-numeric information into the system has been minimized to a great extent through the use of the scrolling menus. When appropriate, a set of alpha-numeric touch pads is displayed in the lower portion of the menu. The three by four layout of the numeric touch pad array is identical to that of the standard touch-tone telephone pad, includes the numbers 0 through 9, and the symbols # and *, and is therefor familiar to the user. Anticipated extensions of the capabilities of this system include direct dialing of a telephone from this touch pad array, in conjunction with the system modem. The seven by four Alphabetic touch pad array is used for the entry of alphabetic data. In the preferred embodiment of this invention, the alpha characters are all upper case letter, but a shift key, as well as other characters may be added to enhance data entry.

FIGS. 6, 7, 8, 9, 10, 11, and 12 show the seven different menu formats that result from scrolling the seven different options in the first or left-most column, into the first column green touch pad area. As this is done, the rest of the menu display changes to show the menu features for each of the first column options. This is how one of the seven main system activities is selected, while all of the other column touch pads remain red. In the preferred embodiment of this invention there are seven main menu activity modes, as shown, which may be selected, although some may be added or deleted.

When "A-V PLAY/RECORD" option is scrolled into the first column touch pad, the menu of FIG. 6 will be displayed. When the "A-V ENTER MEDIA INVENTORY" option is scrolled into the first column touch pad, the menu of FIG. 7 will be displayed. When "PRINT INVENTORY LABELS/LISTS" is scrolled into the first column touch pad, the menu of FIG. 8 will be displayed. When "DEFINE SUBSCRIPTION SERVICE" is scrolled into the first column touch pad, the menu of FIG. 9 will be displayed. When "DEFINE DYNAMIC AUDIO DISPLAYS" is scrolled into the first column touch pad, the menu of FIG. 10 is displayed. When "DEFINE SYSTEM COMPONENTS" is scrolled into the first column touch pad, the menu of FIG. 11 is displayed. When "SELECT AUDIO PLAY DISPLAY" is scrolled into the first column touch pad, the menu of FIG. 12 is displayed.

When the desired mode is displayed in the first column touch pad, the operator may touch that pad to make the selection, at which time the computer will turn that touch pad from green to red, and turn the next second column touch pad from red to green. In this manner the user may scroll through options in one column and make a selection while being able to view all other selections made or to be made in the menu. This leads to a more rapid user assimilation of all system modes and functions, a prerequisite for system acceptance by the widest possible cross-section of users.

Referring to FIG. 6, the "A-V PLAY/RECORD" selection is used to activate the system for the playing, recording or copying of audio-visual data, using the available audio and visual media controllers with their associated media (cassettes, CDs etc) and amplifiers/switchers, and will be the most frequently used menu.

Referring to FIG. 7, the "A-V ENTER INVENTORY" selection is used to enter media inventory. If the user subscribes to an electronic or conventional computer disc mail service for order and receipt of inventory data as described in FIG. 9, the user only enters the media identification such as the ISBN number from the cover of newly acquired media. Without using such a subscription service, the user must manually key in all desired media title and track information.

Figure 8:
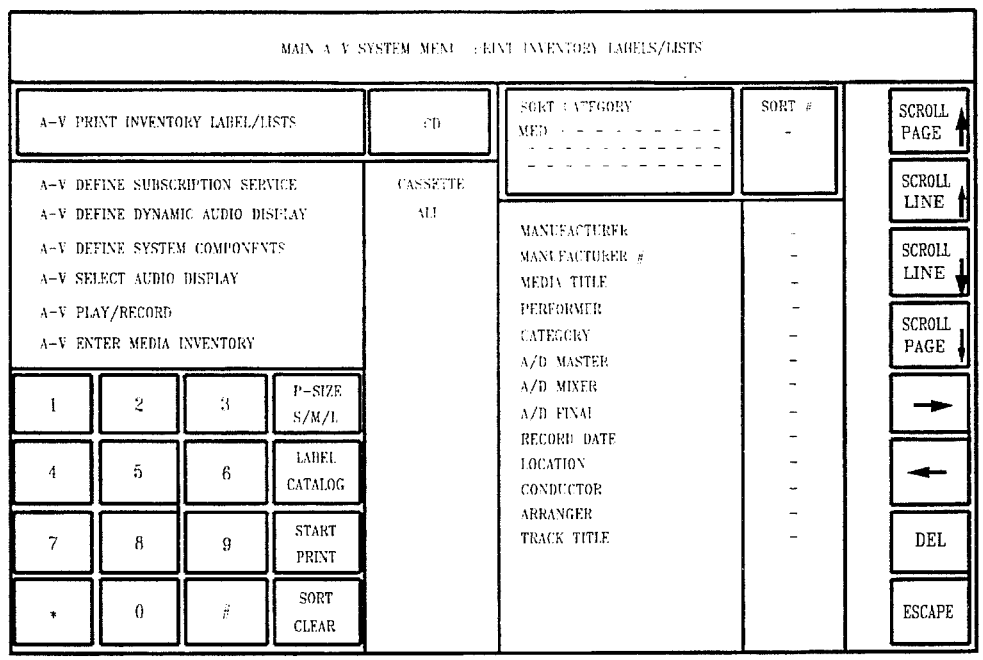

Referring to FIG. 8, the "PRINT INVENTORY LABELS/LISTS" selection is used to permit a user-specified sorting and printing of media catalogs, or the printing of labels for media such as newly recorded audio or video cassettes. As a minimum these labels would contain track names, play times, and remaining record time.

Figure 9:
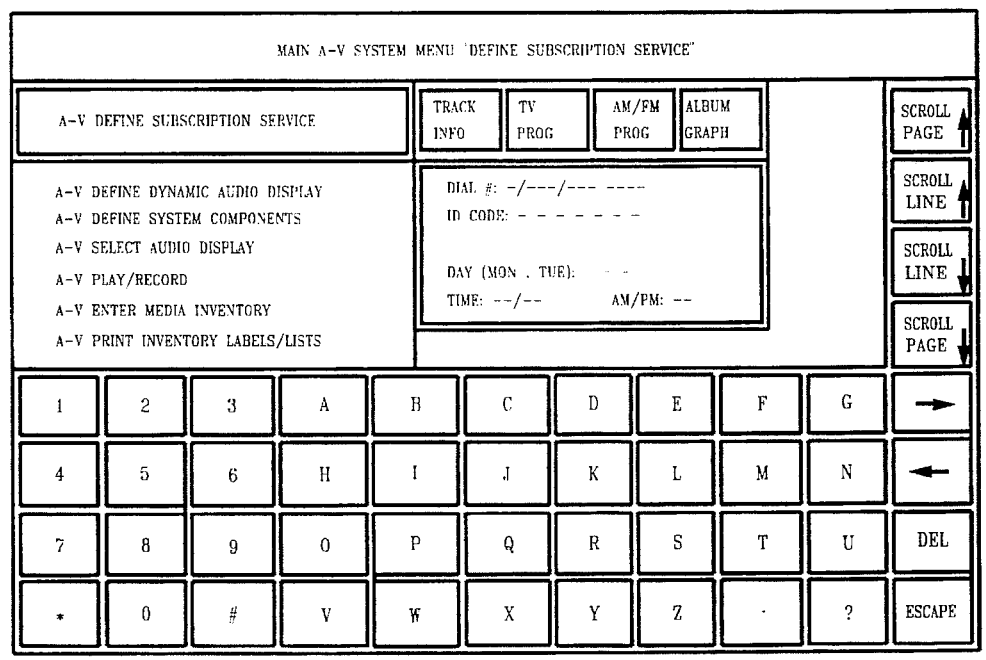

Referring to FIG. 9, the "DEFINE SUBSCRIPTION SERVICE" menu is used by the operator to define the electronic mail setup and phone numbers through which the computer software will automatically, at preset times, call and order and/or receive several kinds of subscription services. These include detailed media content descriptions, TV/AM/FM program listings, and digital images representing album color graphics, which will in turn be automatically loaded into the system data base and made available to the various menus.

Referring to FIG. 10, the "DEFINE DYNAMIC AUDIO DISPLAY" menu is used to define up to nine different graphic displays comprising various groupings of audio frequency band energy and colors. These may be stored and made available for selection and dynamic display during later audio play.

Referring to FIG. 11, the "DEFINE SYSTEM COMPONENTS" menu is used to identify the manufacturer and model number for each of the A-V system components, for the system control software to set IR control codes.

Referring to FIG. 12, the "SELECT AUDIO DISPLAY" menu is used to select from a combination of up to four different types of images which can be presented on the computer color graphics monitor while audio is being played on the A-V system components. These images include the color audio dynamic images, album color graphic, scrolling media title and track title text, and a built-in A-V system display showing a theater stage with curtains which open at the beginning of audio play, and close at the end.

When the A-V computer is powered up, the system will initialize itself and display the main "A-V PLAY/RECORD" menu as depicted in FIG. 6 (if non-A-V system functions such as word processing or spreadsheet processing are to be performed, double touch of the "ESCAPE" pad will cause exit to another function menu).

Referring to FIG. 6, if "A-V PLAY/RECORD" is scrolled into the first column touch pad and selected by touching the touch pad, that pad will turn red and the touch pad of the second column will turn green. At this point the user will be required to use the scroll keys to scroll the second column and select one of the possible system components. The selection is made by scrolling the desired component into the green touch pad at the top of second column and touching the touch pad to cause it to turn red and lock the selection. The list of system play/record components are those identified using the menu of FIG. 11 to be described later. At this point the touch pad at the top of third column will be green, with only two options displayed, RECORD and PLAY. If RECORD is scrolled into the third column touch pad, the forth column will also be displayed. If RECORD is selected in the third column, then a selection must be made from the forth column which provides for operator entry of either a) the serial number (previously assigned by the computer and printed on the label) of an existing partially used media such as a VCR cassette tape, or b) the recording length of a new blank media. The computer uses the information to keep track of both media play time and available remaining record time. The displayed numeric touch pads are used to enter the required data, and a blinking prompt cursor will mark the location of each entry. If "RECORD" is selected for this component, no other selection on this or next level menus are necessary. If "PLAY" is selected, when selections in first and second columns have been made, and the third column touch pad has been touched again to turn the pad background red indicating all selections have been made, the computer will automatically display one of the component sub-menus shown as FIG. 6a through 6f, depending on the component selected in the second column.

If prior to completing the option selections and or data entry, the ESCAPE touch pad is touched, the operation of the main menu will be reset, and no action is taken by the computer. This permits the operator to clear error for re-entry, and also facilitates operator experimentation when learning the system. The ESCAPE pad will also reset operation in a sub-menu if used prior to completion of all selections, and cause return from a sub-menu to the associated main menu.

Figure 6A:
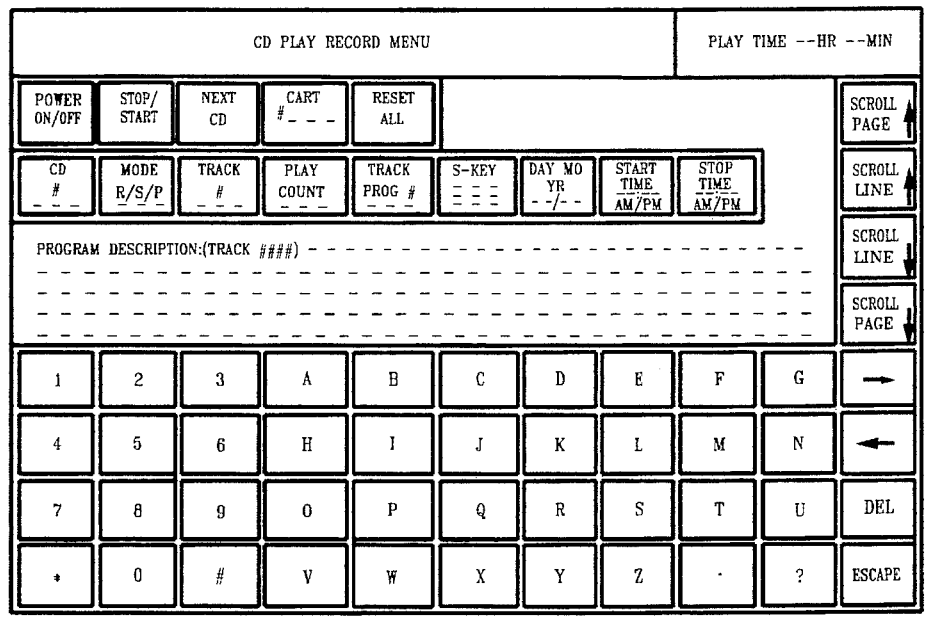

If "A-V PLAY/RECORD" was selected from the first column in the menu of FIG. 6, and if "CD" was selected from the second column, the menu shown in FIG. 6a will be displayed. When this menu, or any of the menus of FIG. 6b through 6g is activated by the computer, the user has already specified in the preceding menu of FIG. 6, the A-V component and PLAY operation. Referring to FIG. 6a, all of the options associated with a CD unit such as select, adjust, control, sequence, and time, are available on the menu. When appropriate, scroll options are available, as are operator input of selections.

There is a commonality of menu functions between this menu of FIG. 6a, and the menus of FIGS. 6b through 6f. The "PWR ON/OFF" touch pad in the upper left corner of the screen allows the power of the CD unit to be alternately turned on or off directly using this touch pad as an on/off switch. If a future play or record session is commanded, the A-V system software will automatically turn on all of the required equipment when required.

The "STOP/START" touch pad to the right of that has a similar on/off mode but controls the unit function rather than its power. This is used for instance to stop a unit play temporarily as would a Pause key. When a media COPY operation is being set up, either the PLAY or the RECORD unit can be set up first. The "PWR ON/OFF" and "START/STOP" pads for the play unit will control both the play and record units through the A-V System software.

The "NEXT CD" pad is touched to indicate that the play requirements for one CD have been completed and that the play requirements for another may be entered. When multiple CDs are being specified as a cartridge load, such as CDs number, for example, one through six on a player capable of holding one or more cartridges, the touch pad labeled "CART #———" is used. The operator will touch the pad to turn its background green, and then will either enter a number using the touch numeric key pad on the lower part of the screen, or will use the scroll keys to scroll previously numbered cassette load numbers until the desired number is displayed. The operator can then specify that cartridge load for play as previously defined, or redefine a previously specified cartridge load.

"RESET ALL" when touched will clear all operator entry relative to the current "CD #———". If touched twice in a row it will clear all operator entry relative to the current "CART #———". As with the "CART #———" touch pad, touch of the "CD #———" pad will cause that pad to turn green and allow the operator to either enter a CD number from the numeric touch key pad on the lower part of the display, or permit operator scroll of existing inventory numbers. As CD numbers are scrolled, the three lines labeled "PROGRAM DESCRIPTION:" will show the CD contents.

The "MODE R/S/P" touch pad permits the operator to specify one of: Random, Sequential, or Programmed play modes. One of the letters "R", "S", or "P" will be green and the other two will be red. Multiple touches by the operator will cause the green lettering to switch from letter to letter, until the desired mode is indicated by a green letter. In the Random mode, tracks and CDs are played in a random sequence with no repeats except as described below where one or more favorite tracks may be scheduled for multiple play, or a track may be assigned no play. In the Sequential mode, all tracks and CDs are played in logical sequence, first all tracks on the first CD, and then similarly on any additional CDs specified. The Programmed mode permits the user to select the sequence of track play, and when Programmed mode is selected, the "TRACK PROG #———" pad will turn green and will show the default number of "1". The user will scroll the "CART #", "CD#" and "TRACK #" to the first track to play. Having scrolled to the first desired "TRACK #———", touch of the "TRACK PROG #———" pad will automatically assign that play priority to the selected track number, at which time the "TRACK PROG #———" pad will increment to two. The "CART#", "CD#" if necessary, and the "TRACK #———" pad area is then again scrolled to the next priority track and the "TRACK PROG #———" is touched again. This process is continued until all desired track priorities have been assigned. Any tracks not assigned a play priority, will default to sequential play after the priority defined tracks have played.

The "PLAY COUNT———" touch pad is always preset to a default count of 1, meaning all tracks will be played once unless otherwise defined. When a track number is scrolled and displayed using the "TRACK #———" touch pad, the play count pad may be touched multiple times. As it is touched it will increment from a default displayed setting of "1", through "2", "3", "0" and back to "1". The last setting on the "PLAY COUNT———" pad, be fore the "TRACK #———" is changed again, will be the number of times that track is included in the track list for Random play. When a setting of other than "1" is set on the "PLAY COUNT———" pad, each time the track number selection is changed, the "PLAY COUNT———" will be automatically reset to the default value of 1, thereby minimizing operator effort.

The "S-Key———" option makes the full power of the computer available to the user in allowing one or more key words (or partial words) reflecting the content of a media or track title to be entered and used as basis for searching inventory for a match. The user may touch the "S-KEY———" pad to cause it to turn from it's normal red background to green. The user may then enter a few letters or words of inventory title search requirement. Touch again of the pad will start the search, and as matches are found, the contents of the matching media and track titles are displayed one at a time along with the media inventory number.

The Scroll keys may then be used to scroll the media data in the records which contained data matching the search key. The scroll keys permit full review of all data in each of the matching records, with the data displayed in the "PROGRAM DESCRIPTION:" area of the screen. At any time in this browsing, touch of the CD #———" pad will cause the number of the matching CD to be entered, or touch of the "TRACK #———" will cause both the CD # and the track number of the matching CD track title to be entered, thereby eliminating the need for the operator to key in any data.

The three touch pads to the right of the "S-KEY———" pad are used when play is to be performed at some time in the future. The "DAY MO YR" pad will always show today's date in the format of DAY OF THE WEEK(3 letters)/DAY OF THE MONTH(2 numbers)/MONTH(3 letters)/YEAR(2 numerics). Touch of that pad will cause it to turn green and the scroll keys will scroll the date. The format for the date was selected to overcome a common confusion caused by dates in some program guides being specified by day of the week and others by day of the month.

The "START TIME" touch pad will always show the current time and will normally be red. When this pad is touched to select a future start time, it will turn green and the scroll keys may be used to select a start time. As a 24 hour period is scrolled, the color of the "AM" and "PM" letters in the pad will show the "AM" as green for AM time and "PM" green for PM time, and red otherwise. A second touch of the START TIME pad will cause it to turn red again as will a touch of the STOP TIME pad. The STOP TIME pad is used to set the stop time, in the same manner that the start time is set. The default setting for the stop time is the same as the start time and is interpreted as no stop time set and play will continue to conclusion.

At the top right of the screen is a computer generated display of computer calculated play time for all selected CDs and tracks. The system user can use this to plan around events such as play/record sessions. This calculated time will take into account any multiple plays or skips. All CD and Cassette loads and play settings made in the menu will be remembered by the computer, and repeated during the next play request without any other effort by the user, until it is desired to make changes. Once all selections on this menu are complete, the user can use this menu to control the device with the START/STOP pad or the PWR ON/OFF pad, or use the ESCAPE touch pad to return to the master menu, leaving all selections set.

Figure 6B:
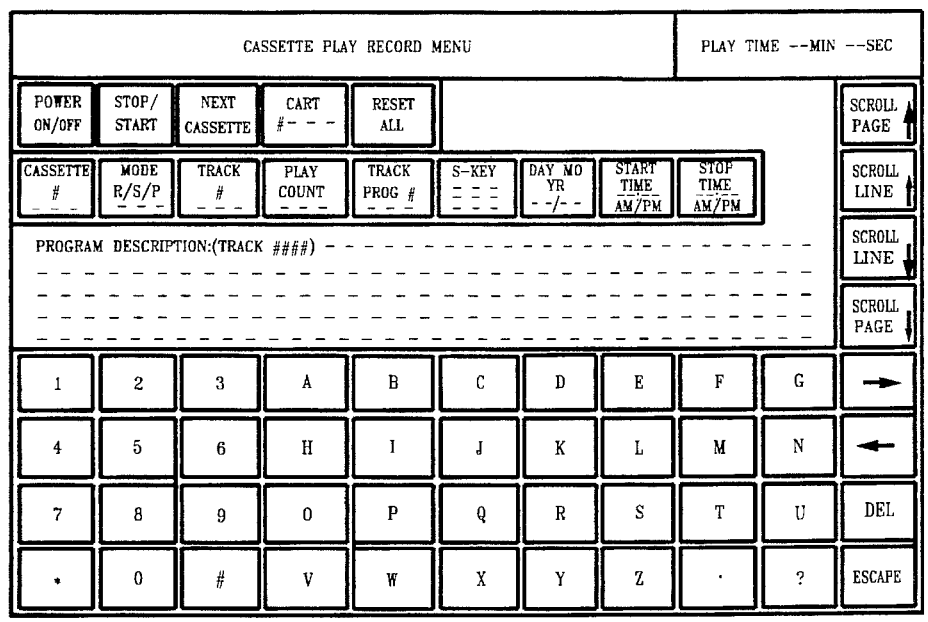

Referring to FIG. 6b, with the first column selection of "A-V PLAY/RECORD" and second column selection of "CASSETT" from the menu of FIG. 6, this is the menu displayed. It is almost identical in function to the menu of FIG. 6a, with the exception that it refers to "CASSETT # ———" rather than CD # ———". It provides the same play and inventory search capabilities, and the function of the touch pads is the same.

Figure 6C:
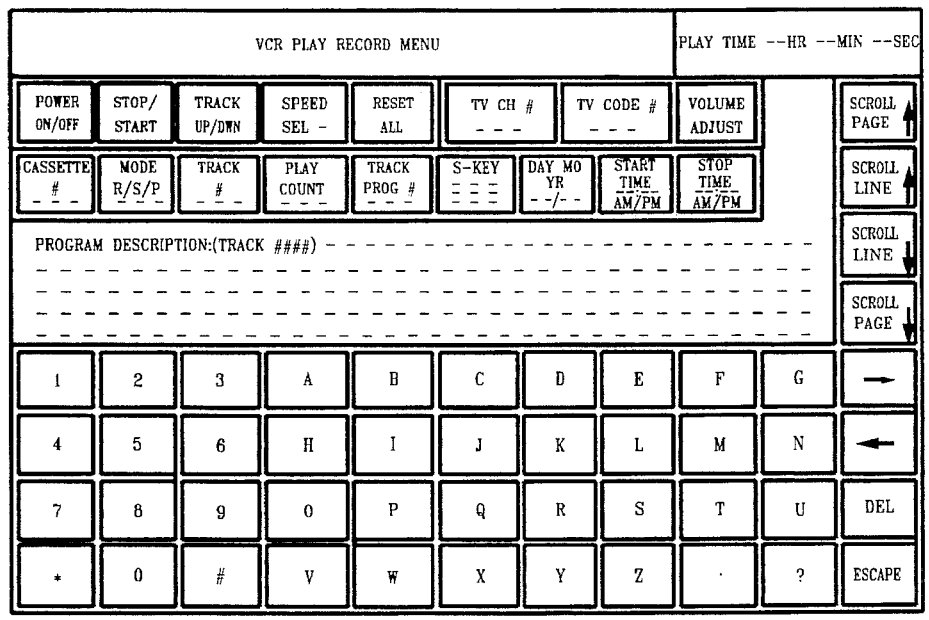

Referring to FIG. 6c, with first column selection of "A-V PLAY/RECORD" and the second column selection of "VCR", from the menu of FIG. 6, this is the menu displayed. It is almost identical in function to the menus of FIGS. 6a and 6b, with the exception that it does not offer a "NEXT CASSET" option or a "CART # ———". In addition it has four added controls. "TRACK UP/DWN" touch pad is normally red but may be kept green by touching it, while the scroll keys are used to adjust the VCR tracking as required.

The "SPEED SEL _" touch pad may be touched multiple times with each touch causing a step through each of up to three different tape speed options. The active speed mode letter will be green in color, while the other(s) will be red. The number of speed options are defined when components are selected for system set up using the DEFINE A-V SYSTEM COMPONENTS menu of FIG. 11, and used in this menu. There are several options to defining the TV channel to be selected depending on whether or not the user subscribes to an electronic source of TV program information. One way is to use the popular universal code which is published weekly and defines all of: program date, start time, stop time and channel, with just one multi-digit code. With this approach, the user touches the "TV CODE #———" pad, and either enters the code using the touch key pad in the lower part of the screen, or (if the user subscribes to a subscription service of TV listings) by scrolling the available program codes and program descriptions until the desired one appears. This will set channel and start/stop times. If the user does not subscribe to an TV broadcast subscription service or does not have access to published listings of the universal codes, he must touch the "TV CH # ———" pad, and then enter the desired channel number using the numeric touch key pad on the lower part of the screen. The user must then set the start and stop times as described for the menu of FIG. 6c. If the user does subscribe to an electronic TV program listing service, he can also search and select program data by touching the "S-KEY" pad (turns green), then keying in a search requirement such as NFL. Touch of the "S-Key pad again turns red, will cause the A-V System software to initiate a search of the TV listing data base looking for programs whose title contain those letters or numbers. In this case, the computer will recall and make available for display and browse, the files of all TV program information that includes the word NFL. The scroll pads can be used to browse these program names along with the air times and channel numbers. The one currently displayed in the "PROGRAM DESCRIPTION" area of the display can automatically be selected by touching the "TV CH #" pad again to turn it red and lock the setting, complete with channel number, date and start/stop times.

Multiple play or record sessions may be defined, and as with other menus, the computer will display the total record or play time in the upper right hand part of the menu. If the record time exceeds the remaining capability of a selected record tape, the computer will alert the user with a warning message in the touch keyboard area of the display, accompanied by an audio beep. The flexibility offered here in play and record of audio tracks, similar to that for audio cassettes, is in response to the increased use of video cassettes for audio only applications because of their superior audio performance and longer play time.

The "VOLUME ADJUST" touch key may be held down (ie touched to keep it green) while the scroll keys are used to adjust the sound volume up or down. Once set, the sound volume selection will be remembered and used on subsequent sessions until changed.

Figure 6D:
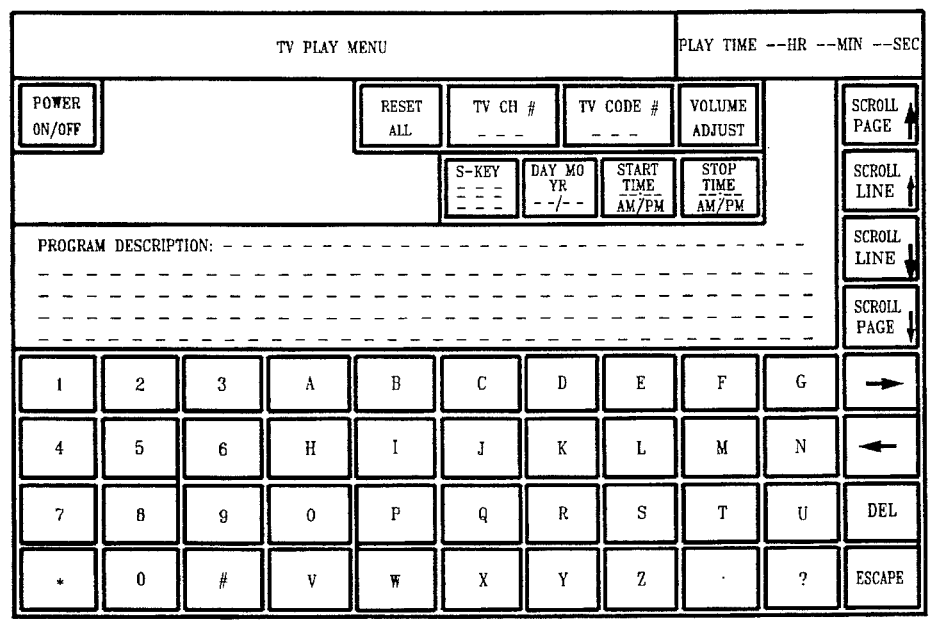

Referring to FIG. 6d, with the first column selection of "A-V MEDIA PLAY/RECORD", and second column selection of "TV" in the menu of FIG. 6, the menu of FIG. 6d is displayed. It offers all of the modes of TV Channel selection and the volume select option described for the VCR in the menu of FIG. 6c. This menu has none of the FIG. 6c menu controls for VCR since there are no media associated with the TV.

Figure 6E:
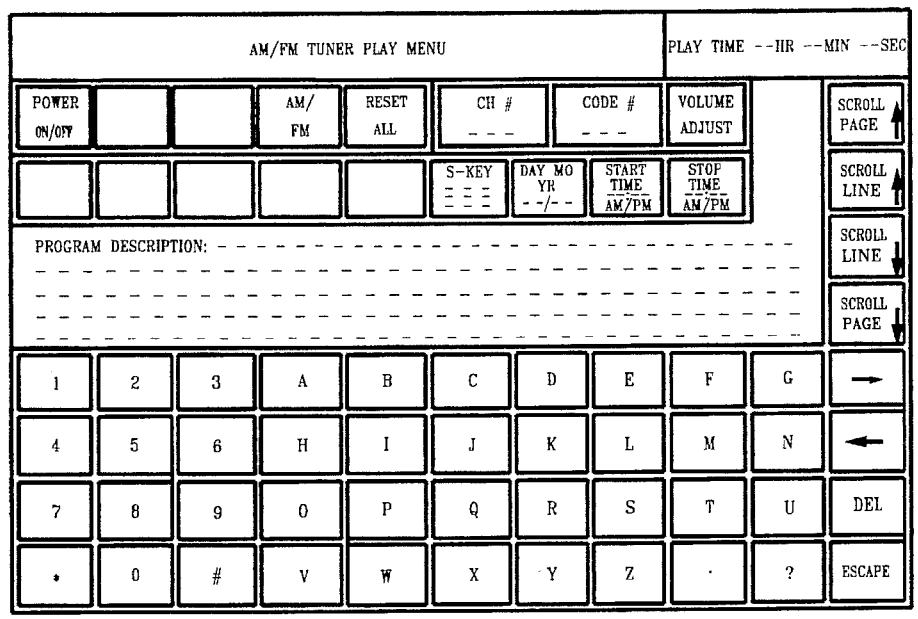

Referring to the menu of FIG. 6e, with the first column selection of "A-V MEDIA PLAY/RECORD" and the second column selection of "A/F TUNER" in the menu of FIG. 6, the menu of FIG. 6e is displayed. It's features are very similar to those available for the TV on the menu of FIG. 6d, except for one additional "AM/FM" touch key to select between AM or FM channels. Consecutive touches of this touch pad will cause either the letters AM or FM to be high-lighted red and the other high-lighted green. Consistent with all menus, the green one is active. Multiple play sessions may be set, and previous day play session settings may be simply repeated.

Figure 6F:
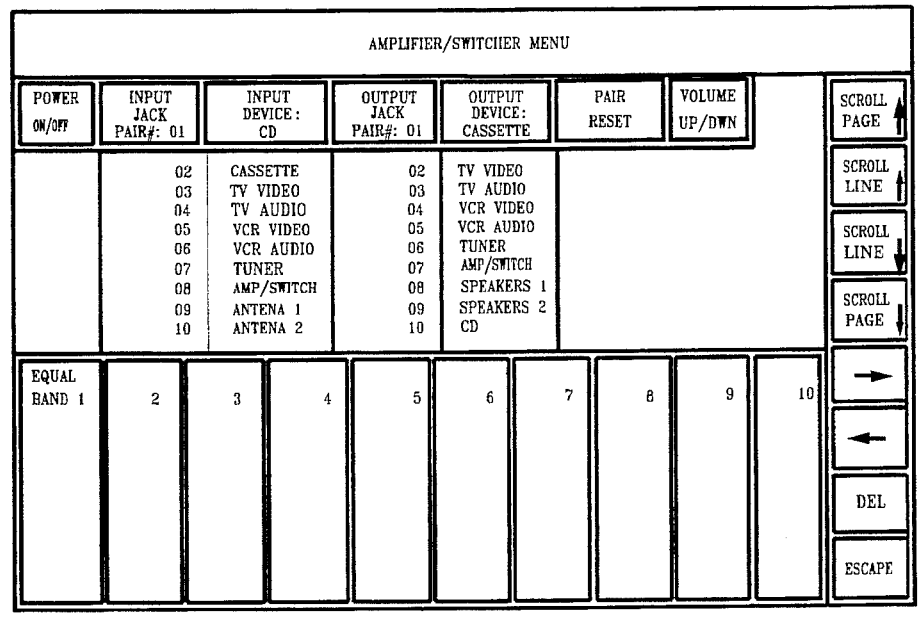

Referring to the menu of FIG. 6f, with the first column selection of "A-V MEDIA PLAY/RECORD" and the second column selection of "AMPLIFIER" in the menu of FIG. 6, the menu of FIG. 6f is displayed. Referring to the menu of FIG. 6f, this menu is used to set the component to component automatic switching options available within the system, to set the master amplifier volume, and to set any automatic equalization options. The component options available on the various components are declared to the system using the DEFINE A-V SYSTEM COMPONENTS menu of FIG. 11. This FIG. 6f menu will display those options for operator selection. Once set, these will continue to be assumed valid and used by the computer as defined until redefined by the user.

The "PWR ON/OFF" touch pad operates as other on/off pads do, the ON and OFF letter sets alternating between red and green letters, green indicating the current status.

The "VOLUME UP/DWN" touch pad operates as on other menus by keeping a finger on the touch pad (making it green) and using the scroll keys to adjust volume up or down. The setting will be remembered and used until changed. The operator must pair input devices to input jacks, and output devices to output jacks. First the operator must touch the "INPUT JACK PAIR #———" column to turn it green, and scroll the first jack pair number into the touch pad. He must then touch that touch pad again to turn it red indicating a selection, then touch the "INPUT DEVICE:———" pad to turn it green, and use the scroll keys to select the device assigned to that input jack pair. Touching the "INPUT DEVICE" pad will turn it red again, locking that match. Other input jack pairs and devices are similarly mated. The letters on the input jack pair numbers and on the input device names in the two columns start out red, and turn green when they are paired. They then maintain their side by side relationship on the display when either is scrolled, until they are scrolled into the touch pad and the "PAIR CLEAR" touch pad is touched. At that time they both turn red again and available for rematch. When the input selections are complete, the output jack pairs and the output devices are similarly matched. The columns of jack numbers and device types available on this menu, reflect those declared to the system using the menu of FIG. 11. Some of these connections may be hard wired and some may be remote controllable as defined in the menu of FIG. 11. The pre-stored vendor A-V component data invoked using the menu of FIG. 11, is used by the A-V system software, in conjunction with settings specified on this menu, to make appropriate component interconnect switching using the IR control link.

The "VOLUME UP/DWN" touch pad operates with the scroll keys as described for other menus. The method of controlling and displaying the selected equalization is unique in that it emulates the familiar form of display found on the front of most high-end amplifiers. In the preferred embodiment of this invention, the bottom row of ten touch pads provides for ten bands of equalization control. There could more or fewer. To set these, like the volume, each of the Equalization touch pads is held down one at a time, and the scroll keys are used to adjust the height of a vertical yellow bar within the touch pad. The height of the yellow bar is directly related to the percent of pass for that frequency band, from near zero for a very low height bar, to near one hundred percent for a near full height bar.

Referring to FIG. 7, this menu is displayed when the first column of the main menu of FIG. 6 is scrolled to have "A-V ENTER MEDIA INVENTORY" scrolled into the first column touch pad. This menu requires only the selection of a media type from the second column. The media types shown for this preferred embodiment are "AUDIO CD", "A-CASSETT" (audio cassett tape for the audio cassett player) and V-CASSETT (video cassett tape for the VCR). Other media may be added such as phonograph records, reel to reel audio tapes and video disc along with their respective record-playback machine and menus.

Once the touch pad of the second column is touched to turn it green and it is scrolled to show the desired media in the touch pad, touching the pad again will lock the selection and cause the menu display of FIG. 7a, which is used to a) enter media parameters manually if the user does not subscribe to a conventional mail or electronic mailing service for media content data, to enter the minimum media identification such as manufacturer name, manufacturer's #, media title, and performer name, or to b) examine and modify media content information delivered by subscription service, or after manual entry.

All pre-recorded media come with one of several forms of numeric or alpha-numeric identification code printed on the package, which can range from five to twelve digits. The twelve digit code uniquely identifies the recorded media and manufacturer, while the smaller codes such as those on some audio cassette tapes are unique only to that particular manufacturer. When a media is introduced to this A-V System, all available information from the media package should be entered into the computer (but does not have to be) to facilitate retrieval and sorting for catalogs, but in addition, the A-V system software will automatically assign a unique thirteen digit identification number to each physical media, whether it is a purchased pre-recorded media or a copy made on the system for personal use, or recorded from broadcast programs for personal use. For ease of operator reading and entering multi-digit numbers or mixed numbers and alphabetic or other symbol data, any set of symbols exceeding three in length will be displayed in sets of three with alternating yellow and white highlight. When the system prints these numbers, alternate groups of three symbols will be underlined.

Referring to FIG. 7a, the list of media features includes those normally found on media jackets. The most familiar to the user will be the "MEDIA TITLE", main performer "PERFORMER 1", the track numbers, play times and titles, and the producer. Often other performers are also listed, as are conductors and arrangers. Also listed, at least on digital CDs, is the Digital or Analog genealogy of the recordings. The "A/D, MASTER—MIXER—FINAL—" parameters for instance relate to the quality of the recording chain used in producing delivered recorded media, with analog recording (noted as A) providing poor quality compared to digital (noted as D). Popular music in the 1940s was recorded on Analog mixer tape, Analog master tape, and Analog final media such as phonograph or audio cassette, with resulting poor quality (AAA) of the final product including a great deal of tape hiss. Some producers have been able to go back to the old Analog Mixer tape and produce a Digital final, with some improvement in quality (AAD).

Where they still exist, it has been better to go back to the original Analog Master tape and produce new Digital Mixer and Digital Final tapes with even better quality (ADD). Present day high quality recordings are Digital from start to finish (DDD). Avid music lovers therefor are acutely aware of and interested in the differences among their media holdings. The manufacturer is also listed on media jackets, as is the manufacturer's number, or the more general bar code number. Sometimes the recording location and date are included. The menu shown provides for all of these, and entry of data is the users option. When a subscription service is used to acquire the media feature data, it will include most or all of this information. Only one of the fields, the "MEDIA #" field, is fixed length. All of the others are variable length.

The "TRACK #" fields are variable length, with the fixed length play time field at the beginning of each. The media feature lines are organized on the screen as two columns of data so as to make as much data as possible available for viewing by the user. As the scroll pads are used to scroll the data from the two columns into the touch pad, they scroll from computer memory into the bottom of the right column, from the top of the right column to the bottom of the left column, and from the top of the left column into the touch pad. This flow sequence reverses with reverse scroll. Since the data lines in the two lower columns are shorter than the Touch pad line, data in the lower columns will be abbreviated by the computer for display, only in the lower columns. When entering data into a line in the touch pad, the user will type until the entry is complete, or until the available touch pad line space is full.

When this menu is entered, the main touch pad for data entry will have a red background. If the user subscribes to a mail order subscription service for media data (as described in FIG. 9), then when he acquires a new media and wants to log it into the system using this menu, he need only enter the second, third, forth and fifth categories of data (ie MANUFACTURER, MANUFACTURER #, MEDIA TITLE, and PERFORMER) for media identification, since the remaining information will be automatically ordered and automatically integrated into the data base. Otherwise all of the information available should be manually entered, including track titles and track play times.

The "MEDIA #" assigned by the A-V System always appears in the upper right corner of this menu. When the "S-KEY" is used in conjunction with specification of a data content search, the "MEDIA #" also appears as the first data item in the list of media features, as shown in this Figure. Whenever the menu of FIG. 8 is used to print inventory lists, the Media number is printed and is a generally useful tool in specifying a particular media without having to type the number.

When the menu is first entered it will be displayed as in FIG. 7a, with "MANUFACTURER———" in the media information touch pad of the second column, and the touch pad background will be red. If data entry is to be done, operator touch of the touch pad will turn it green, with a blinking cursor on the first data entry position. This cursor will guide the entry of all data. If the user wishes to skip an entry field, or when an entry has been completed, touching that touch pad once will cause the next entry title to move into the touch pad. The scroll keys may also be used to move up or down through the entry fields, while the touch pad remains green. When all of the data for one media, such as a CD, has been entered, touch of the "MEDIA DONE" touch pad will cause that media file to be stored, the touch pad to turn red, and the screen set up to accept another entry. The media parameters shown are the preferred embodiment but parameters may be added or deleted.

The "S-KEY" touch pad is used to browse inventory and recall media data based on the content of particular fields. This might be used for instance to recall a previously entered media file to fill in additional fields of data. When the data touch pad has been touched to turn it green and data category has been scrolled into the touch pad of column 2, and the "S-KEY" is touched to turn it green, the mode of scroll in the main touch pad will change, and scroll keys may be used to scroll only that one category of data for all media records (such as only "MEDIA TITLE" or only "MEDIA #"). Alphabetic data fields will be reviewed in alpha sort sequence, and numeric fields will be reviewed in numeric sort sequence. This supports the most frequent basis for media file retrieval and update. When a file or group of matching files has been retrieved using the "S-KEY", touch of the green "S-KEY" pad will cause it to turn red, and this data retrieval by content mode will revert to a data entry mode. Changes or additions can then be made. When one media data entry has been completed and others are planed, the sequence is repeated, starting with touching the main touch pad to turn it red. Use of the "ESCAPE" touch pad will cause return to the main menu of FIG. 7.

When the first column of the main menu of FIG. 6 has been scrolled to show "A-V PRINT INVENTORY LABELS/LISTS" in the green touch pad, the menu of FIG. 8 will be displayed. Selection of that mode by touching the green pad will turn that pad background red, and the touch pad of the second column will turn green. Referring to the menu of FIG. 8, the user must then use the scroll keys to move the required media type in the second column into the touch pad area. The displayed list will include the media types for all system components identified in the Menu of FIG. 11, such as CD players, audio cassette record/playback units, and VCR record/playback units. The media list shows Audio CD, Audio Cassette, Video Cassette, and All. Examples of other possible media not shown on this menu but anticipated in this invention include phonograph records and reel-to-reel audio tapes.

Referring to FIG. 8, when selection for media type has been scrolled into the second column touch pad, and the pad touched, that pad will turn red locking the selection and the touch pad of the third column for "SORT CATEGORY" will turn green. Scroll and selection of categories from the "SORT CATEGORY" column number three, in conjunction with priority number assignments made by column 4 "SORT#" number assignments, establish the sort sequence to be used by the software. When entering the menu, the default or starting setting for the number in the forth column is "1". When the first sort category is scrolled into the third column and the "SORT #" touch pad is touched, the sort sequence #1 is assigned to the category shown in the third column touch pad (which then turns red), and that number remains opposite that category when the third column is scrolled. The touch pad of the third column may be touched again to turn it green and allow scroll of the next sort category into the touch pad. The process continues until all desired sort levels have been assigned to categories.

At that time, the "SORT CAT:" touch pad may be touched to turn it's background red and end the sort specification. An example of a sort specification might be to have a first level sort by type (such as popular, rock and roll and western and whatever other categories are in the user's collection), and sort within each of those categories by alphabetical "MEDIA TITLE". A single media may be selected, such as for a label, by scrolling to "MED #" and keying in the desired number of that one media. If the "MED #" is left blank, it becomes a sort criteria that will be used to organize or group the data on print out. This assignment of sort criteria and their priorities may include up to nine different categories, although normally no more than two or three sort criteria would be used. If the sort criteria set at some previous time are to be changed, or errors in this entry require correction, touch of the "SORT CLEAR" pad will reset all sort numbers.

The "P-SIZE S/M/L" touch pad always has one of the three letters S, M, or L shown in green and the other two in red. Each touch of the pad will step the green color to the next size selection so that print sizes of Small, Medium, or Large may be specified. These range from a full eight and one-half by eleven inch page size easily read catalog for the Large selection, to a highly compressed quick reference size.

The "LABEL/CATALOG" touch pad always has either the word LABEL or the word CATALOG in green and the other in red. Each touch of the pad will reverse the colors on the two words. The CATALOG function has just been described. The LABEL function command enables the printing of a media label. The scroll keys will scroll all available system media numbers so that the media number (and associated title if there is one) for the desired label may be left displayed.

Touch of the "START PRINT" touch pad will result in a label or labels being printed for that media with "LABEL" selected, or a catalog with "CATLOG" selected. The label size, shape and content will be automatically tailored to the media as a default unless the user changes the size selection. For a VCR cassette tape there will be two labels. The smaller one for the small edge of the VCR cassette will list cassette number and program names only. The larger one for the side of the cassette will show more information such as titles and play time of each title on the tape. For audio cassettes, there would be a small label for the end of the plastic case, another small one for the side of the cassette itself, and a larger one to insert into the case with detailed track information. All labels would be printed on adhesive backed particulatable (easily peeled) paper. As with other menus, the "ESCAPE" key is used to return to the main menu.

FIG. 9 shows the menu available when "DEFINE SUBSCRIPTION SERVICE" is scrolled into the touch pad of the first column in FIG. 6. Referring to FIG. 9, the four top touch pads in the second, third, forth and fifth columns are used to subscribe to the four kinds of electronic mail or conventional mail service to receive information very useful to the A-V system. The second column touch pad labeled "TRACK INFO" is touched (turns green) to set up a capability for automatic request for, receipt of, and data base integration of media content information.

With this service, any new media logged into the system using the menu of FIG. 7, where the media type, manufacturer name, manufacturer #, and album title have been identified, will trigger the automatic order and receipt of the rest of the media content information. Depending on the nature of the subscription service available, the information will arrive via electronic mail using the phone line and communications modem, or by conventional mail on computer compatible disc, and will include track names, play times, performer information, and any other information available which describes the media contents. If the "TRACK INFO" arrives on computer disc in the mail, the user will insert the disc into the computer for automatic integration into the media data base. If electronic mail is used to receive the data, no action is required on the part of the user. This information will then be available for review or use in the menus of FIGS. 6, 7, 8 and 12.

The "TV PROG" and "AM/FM PROG" touch pads are each used to set up either automatic order or receipt or both, of TV and AM/FM programming data which would include program names, channels, dates, and times. These may also include the universal codes which with one multi-digit number identify all of each program's attributes (program name, channel, date, and time). When received, the TV program information may be browsed and used in the menu of FIG. 6c, and the AM/FM programming information may be browsed and selected in the menu of FIG. 6e.

The "ALBUM GRAPH" touch pad may be used to set up a subscription service to receive the color and/or black and white graphic images from the album covers of media. These will be in digital computer compatible format, and when received, they will be automatically loaded into the data base, identified with the same media number assigned to the media itself, and made available for selection and display using the menu of FIG. 12. Only one of the four touch pads of second, third, forth and fifth columns will be green at any one time.

When the "TRACK INFO" touch pad is touched, that key will turn green and the other three will turn red. The user will then be prompted with a blinking cursor to enter the number to be called, the users ID code, the day of the week to call (if necessary) and the time to call (if necessary). Any or all of these data fields may be skipped if not relevant to a particular subscription service. This process is repeated for each of up to four data type touch pads. If the same subscription service-supplies more than one of the services, each must still be filled in.

After this initialization, the system can automatically perform the following functions as specified: a) search inventory for new media in the inventory for which no content data has been ordered, order that data, receive it, and integrate it into the data base, b) search inventory for new media in the inventory for which no album graphics have been ordered, order that data, receive it, and integrate it into the data base, and c) order the specified AM/FM and/or TV program listings, receive them, and integrate them into the data base. This subscription data may also be ordered by other than automatic means and then received automatically, since the auto answer and data receipt by the communications modem, is independent of auto call and output of information. This latter approach might be used to control the number of expensive color graphs ordered and received. Other subscription service options include a user ordering TV and/or AM/FM listing services by phone or mail and then receiving them electronically using the modem auto-answer option.

Referring to the menu of FIG. 10, when the first column of FIG. 6 is scrolled to put "A-V DEFINE DYNAMIC AUDIO DISPLAY" in the first column touch pad, the menu of FIG. 10 is displayed. As described elsewhere in reference to FIGS. 2, 3 and 4, an audio monitor connected to the users A-V system audio amplifier, provides an audio volume measurement for each of sixteen audio bands several times per second. These are sent to the computer over a return IR communication link, where the information is used by the system software, under the users guidance, to define and store the specifications for up to ten different dynamic color graphic images which can be displayed on the screen while listening to the media playing.

Of the ten possible dynamic audio images, number zero is a basic default graph template which can be displayed, and is also the starting point for user modification in designing and storing up to nine additional audio displays for future use. In the basic graph, the sixteen channels of audio information received from the system audio amplifier, are numbered one through sixteen in the second column, and their default band widths are all equal and set at one hundred and twenty five Hertz each for a total bandwidth coverage from approximately zero Hertz to approximately two kilo Hertz, shown in the third column. The color of band one is red, and the band colors range from red, through hues of orange, yellow, green, and blue to violet for the band sixteen.

To define a new graph for display, touch the "NEW GRAPH #" pad. It will turn from red to green, and the displayed number will change to the next unused number from one to nine. That will be the number of the graph to be created. Zero is the number of the basic graph. Touch of the second column touch pad labeled "BAND #" will turn it green and the band numbers may be scrolled into the touch pad one at a time. For each band number, the third column "BAND WIDTH" touch pad may be scrolled up or down to adjust the frequency bandwidth of that band. As each band "from" and "to" frequency numbers are scrolled, they are superimposed on a horizontal color bar whose color is designated for that band, and whose width is proportional to the relative width of the to/from bandwidth designation. The user then can visualize the final display, in color, as it is being generated.

A frequency band (and the associated color) can be eliminated by reducing a "to" value to be equal to the "from" value, essentially reducing a particular band to zero and eliminating that color. All bands have a start frequency 1 more than the preceding band end frequency. The beginning frequency for the first band is always zero, and the end frequency for the last band is always two kilo Hertz. When a graph definition is complete, touch of the "NEW GRAPH #" touch pad again will cause the number shown in that pad to increment by one, the pad to turn red, and the graph specifications to be stored with the graph number for later recall and dynamic display during audio system play.

To recall an existing graph and modify it, the "RECALL #" touch pad must be touched, turning it green, and the scroll keys may be used to scroll the desired graph number. As the graph numbers are scrolled, the graph specifications are scrolled in the second and third columns. When the desired graph is on the screen, the desired changes may be made, and then a touch of the "RECALL #—" pad will store the graph with those changes and the same graph number.

Referring to FIG. 11, this menu is displayed when the first column of FIG. 6 is scrolled to move "DEFINE SYSTEM COMPONENTS" in the touch pad. When the green first column touch pad is touched to make that selection, it turns red and the touch pad of the second column turns from red to green. This permits scroll and selection of the various system component options. As each of the several types of system components are scrolled in the second column, a built-in list of commercially available manufacturers units and their model numbers for that type of component (such as CD players) is displayed for scroll and selection in the touch pad in the lower portion of the screen. For instance, the menu shows "CD CONTROLLER" in the second column touch pad, and in the lower portion of the screen, all of the significant industry available CD Controllers are listed for scroll and selection.

To make and lock a selection, the user will scroll a component in the second column into the touch pad and touch that pad to turn it red. The lower manufacturer column touch pad will turn green permitting scroll of that data. When the user scrolls a manufacturer and model number into this pad and touches that pad, it will turn red, locking the selection. The second column touch pad may be then touched again, turning it green and starting the selection of another system component.

When each manufacturer's component type is identified in this manner, the A-V System software immediately extracts from the associated pre-stored data base all of the relevant remote control and interface information which will be used to manage that unit. In the component list in the lower menu, all components are shown in red letters except the one or ones selected which will turn green, so that the user may review his selections at any time. Scrolling a green lettered component into the touch pad area and touching the pad will deselect that component by changing the letters to red again.

When all necessary selections have been made, touch of the "ESCAPE" pad will end the component identification process and cause return to the main menu of FIG. 6. This menu shows only one of each type of media controller or amplifier, but the system can include multiple units of each type, and in fact several VCRs and several TVs are common in a system. When multiple components of a type are defined, they are automatically assigned numbers starting with number one, and this number appears with the component in all menus. This menu operation is done only once when the system is initially set up, and again when any system components are added, deleted or changed. Once the components are identified, the system software extracts the relevant control and inter-connect information automatically, and uses that information during the response to other menu operations such as the menu 6*a* through 6*f* Play Record menus.

Referring to the menu of FIG. 12, when "SELECT AUDIO DISPLAY" is scrolled into the touch pad of the first column of FIG. 6, the menu of FIG. 12 is displayed. The second, third, forth, fifth and sixth columns have touch pads labeled "ALBUM GRAPH", "TRACK INFO", "AUDIO BAND #", "STAGE GRAPH", and "INTRO ON/OFF" respectively. Any or all of these may be selected to be displayed on the color graphics screen during audio play. On entering this menu, the color of the pads in the these columns will reflect the most recent selections. Alternate touches of any of these five colums, except "AUDIO BAND" which has ten sequential green selections and one red, will change the pad color from red to green to red, and any or all of these may be green (or red) at one time. "ALBUM GRAPH" will be selected when that pad is green. Any graphs that have been acquired and stored in the system as described for FIG. 9, will be displayed on the color monitor as the associated audio media is played. Touch of the "TRACK INFO" pad to turn that pad from red to green, will cause any track content information that has been keyed into the system by the operator or remotely acquired and stored as described for FIG. 9, to be displayed on the color monitor as a scrolling overlay on any other displayed images. Multiple touches of the "AUDIO BAND #" pad will cause the pad to cycle through eleven steps, starting with the step to which it was last set. The steps are: red background (not selected) with the number zero displayed, green with the number zero displayed (meaning the basic audio graph described in FIG. 10 will be displayed, and then green with the number stepping from number one through nine, and then back to Red with the number zero displayed. This permits the options of: no dynamic audio display, the basic dynamic audio display, or any one of nine user-defined dynamic audio displays. Any of these potential graph numbers one through nine that have not yet been defined using the menu of FIG. 10, will be skipped. If the pad is left green, the graph number showing will be displayed on the screen during all audio play.

Touch of "STAGE GRAPH" will turn that pad green, and will cause a built in graph to be displayed during audio play. The Stage Graph consists of an image of a stage with curtains which open at the beginning of a media play, and close at the end. Touch of the "INTRO ON/OFF" will turn that pad green and enable the automatic audio introductions to the audio as each media and track begin. Touch of that pad again will turn it red and disable that feature. If any one of the second through sixth columns display options are selected, it will fill the screen. If multiple display options are selected, they will be superimposed in the most visually pleasing manner, such as the upper two thirds of the display screen used for the stage graphic, with media graphic centered on the stage, and scrolling media and track title information over the graphic, and with the audio band graphic assigned to the lower one third of the display screen.

When all display requirements are completed, touch of the escape pad will cause a return to the main menu of FIG. 6, or touch of the "DISPLAY" pad will cause entry to the menu of FIG. 12a which has minimum clutter from touch pads, and provides a good forum for the graphic displays. The display settings made in this mode, will be remembered and used in any subsequent audio play operations, until changed.

Referring to FIG. 12a, when FIG. 12 has been used to enable any of the display modes which can accompany audio play, the menu of FIG. 12a is the screen on which those graphics are displayed. The only selection option on this menu is "ESCAPE", which will cause return to the menu of FIG. 12 where display changes may be made, or to use the "ESCAPE" pad on the FIG. 12 menu to return to the main menu of FIG. 6.

The software program functions hereinabove described and defined for the audio-visual control and inventory system may be coded and reduced to practice through the use of ordinary skills in the art of computer programming, which reduction may include variations and modifications of those functions. Those variation and modifications may nevertheless represent applications and principles within the spirit and scope of the instant inventions as defined by the following claims.

What is claimed is:

1. An audio-visual computer system with computer programs for media inventory database management and for controlling the operation of audio-visual components via infra-red (IR) signals for playing/recording audio-visual programs on media, comprising:

a personal computer;

disc memory means contained within said personal computer for storing media inventory database and said computer programs;

processor means contained within said personal computer for executing said computer programs;

touch-screen display means contained within said personal computer for displaying plurality of menus created by said computer programs and for input of inventory data;

IR transceiving means contained within said personal computer having antenna mounted on said personal computer for transmitting said IR signals to and controlling said audio-visual components, said computer programs being adapted to control the transmitting of said IR signals to and controlling said audio-visual components; and media inventory database management system means contained on said disc memory means for storing and retrieving media information;

said media inventory database management system means comprising: means for acquisition, permanent storing over some time interval, cataloging, selecting, and retrieving of information about media name, number, track numbers, media and track content, times, performers, air-time program listing, and digitized media graphic images, whereby said computer programs allow browsing of said menus, search by partial keys, display of said media inventory and automatic, unattended data aquisition, initialization, scheduling and control of said audio-visual components, storing and recalling of a list of selections for control of said audio-visual components to be performed over some time interval.

2. The audio-visual computer system of claim 1 wherein said computer programs function to present on said touch-screen display a plurality of menus, said menus comprising:

play/record menu for controlling the operation of said audio-visual components; and enter media inventory menu for storing media information on said disc memory means.

3. The audio-visual computer system of claim 1 wherein said audio-visual components comprise TV, Video Cassette recorder/player, CD player and Audio Cassette recorder/player, and wherein said media comprises CD discs, Video Cassettes and Audio Cassettes.

4. The audio-visual computer system of claim 1 further comprising, contained within said personal computer, a label printing means for printing labels for said media and a printing means for printing said inventory of said media.

5. The audio-visual computer system of claim 1 further comprising input means contained within said personal computer for receiving media content, graphic information and audio-visual components air-time program listing information, and wherein said computer programs function to store said media content, graphic information and audio-visual components air-time program listing information on said disc memory means for display on said touch-screen display means.

6. The audio-visual computer system of claim 5 wherein said input means contained within said personal computer further comprising means for receiving audio-visual media graphic images, and wherein said computer programs function to load said media graphic images on said disc memory means for display on said touch-screen display means during playing of said audio-visual components.

7. The audio-visual computer system of claim 1 wherein said IR transceiving means further including means for receiving IR signals from said audio-visual components for monitoring output audio level of said audio-visual components.

8. The audio-visual computer system of claim 7 wherein said computer programs display a dynamic graphic representation of said output audio level of said audio-visual components on said touch-screen display means, while the user is listening to said audio-visual components.

9. An audio-visual computer system with computer programs for media inventory database management and for controlling the operation of audio-visual components via IR signals for playing/recording audio-visual programs recorded on media, comprising:

a personal computer;

disc memory means contained within said personal computer for storing media inventory database and said personal computer programs;

processor means contained within said personal computer for executing said computer programs;

touch-screen display means contained within said personal computer for displaying plurality of functional menus created by said computer programs and for input of inventory data;

IR transceiving means contained within said personal computer having antenna mounted on said personal computer for transmitting said IR signals to and controlling said audio-visual components, said computer programs being adapted to control transmission of said IR signals to and controlling said audio-visual components;

remote IR transmitting means for sensing and encoding output audio volume level of said audio-visual components and for transmitting encoded IR signals from said audio-visual components;

said IR transceiving means is further adapted to receive said encoded IR signals from said remote IR transmitting means for monitoring the output audio volume level of said audio-visual components;

media inventory database management system means contained on said disc memory means for storing and retrieving media information;

said media inventory database management system means comprising: means for acquisition, permanent storing over some time interval, cataloging, selecting, and retrieving of information about media name, number, track numbers, media and track content, times, performers, air-time program listing, and digitized media graphic images, whereby said computer programs allow browsing of said menus, search by partial keys, display of said media inventory and automatic, unattended data aquisition, initialization, scheduling and control of said audio-visual components, storing and recalling of a list of selections for control of said audio-visual components to be performed over some time interval; and printing means for printing media inventory information stored within said media inventory database.

10. The audio-visual computer system of claim 9 wherein said audio-visual components comprise any combination of TV, Video Cassette recorder/player, CD player and Cassette recorder/player, amplifiers and speakers, and wherein said media includes CD discs, Video Cassettes and Audio Cassettes, and wherein said computer programs function to create said plurality of functional menus for controlling operation of said audio-visual components, and for maintaining said media inventory database.

11. The audio-visual computer system of claim 9 wherein said touch-screen display means display plurality of functional menus, said menus having juxtaposed aligned scroll touch pads and having selection touch pads, said selection touch pads changing background colors to indicate enabled states, wherein said scroll touch pads scroll selection options on to said selection touch pads.

12. The audio-visual computer system of claim 11 wherein said plurality of functional menus comprise a play-record main menu for selecting play or record operations of said audio-visual components, and further comprise a respective sub-menu for controlling each of said audio-visual components.

13. The audio-visual computer system of claim 11 wherein said plurality of functional menus comprises:

play/record main menu for controlling the operation of said audio-visual components;

enter media inventory main menu for storing media information in said media inventory database;

print inventory main menu for printing media information stored in said media inventory database; and audio display main menu for displaying dynamic graphic representation of said output audio volume level of said audio-visual components, while the user is listening to said audio-visual components.

14. The audio-visual computer system of claim 13 wherein said computer system further comprises input means contained within said personal computer for receiving audio visual components air-time program listing, media content and media graphic information, said computer programs functioning to load said audio-visual components air-time program listing, media content and media graphic information into said disc memory means for display on said touch-screen display means, and wherein said plurality of functional menus further comprises a subscription main menu for controlling said input means for storing said audio visual components air-time program listing, media content and media graphic information in said disc memory means.

15. The audio-visual computer system of claim 13 wherein said computer system further comprises define audio display main menu means for defining the graphic representation of said output audio volume level.

16. The audio-visual computer system of claim 13 wherein said computer system further comprises define system components main menu for defining number, combination and interconnection of said audio-visual components.

17. An audio-visual computer system with computer programs for media inventory database management and for controlling via IR signals the operation of audio-visual components of one or more TV sets, Video Cassette recorder/players, CD players and Cassette recorder/players, amplifiers and switchers generally controlled by and adapted to receive IR signals and where said media includes CD discs, Video Cassettes and Audio Cassettes for playing/recording audio-visual programs recorded on media, said system comprising:

a personal computer;

disc memory means contained within said personal computer for storing media inventory database and said computer programs, said computer programs functioning to create a plurality of functional menus, for controlling said audio-visual components, and for maintaining the media inventory database;

processor means contained within said personal computer for executing said computer programs;

touch-screen display means contained within said personal computer for displaying said plurality of functional menus generated by said computer programs and for input of inventory data;

IR transceiving means contained within said personal computer having antenna mounted on said personal computer for transmitting said IR signals to and controlling said audio-visual components, said computer programs being adapted to control the transmission of said IR signals to and controlling said audio-visual components;

remote IR transmitting means for sensing and encoding output audio volume level of said audio-visual components and for transmitting encoded IR signals from said audio-visual components;

said IR transceiving means is further adapted to receive said encoded IR signals from said remote IR transmitting means for monitoring the output audio volume level of said audio-visual components;

media inventory database management system means contained on said disc memory means for storing and retrieving media information;

said media inventory database management system means comprising: means for acquisition, permanent storing over some time interval, cataloging, selecting, and retrieving of information about media name, number, track numbers, media and track content, times, performers, air-time program listing, and digitized media graphic images, whereby said computer programs allow browsing of said menus, search by partial keys, display of said media inventory and automatic, unattended data acquisition, initialization, scheduling and control of said audio-visual components, storing and recalling of a list of selections for control of said audio-visual components to be performed over some time interval; printing means for printing media inventory information within said media inventory database; and input means contained within said personal computer for receiving audio-visual components air-time program listing, media content and media graphic information, said computer programs functioning to load said information on said disc memory means, for display on said touch-screen display means, and wherein said plurality of functional menus further comprises a subscription main menu for controlling said input means for storing said information in said disc memory means.

18. The audio-visual computer system of claim 17 wherein said plurality of menus comprises:

play/record main menu for controlling operation of said audio-visual components;

enter media inventory main menu for storing media information in said media inventory database;

print inventory main menu for printing media information stored in said media inventory database;

audio display main menu for displaying dynamic graphic representation of said output audio volume level of said audio-visual components, while the user is listening to said audio-visual components;

define audio display main menu for defining the graphic representation of said output audio volume level;

audio display main menu for displaying the graphic representation of said output audio volume level and said media graphic information;

system components main menu for defining combination and interconnection of said audio-visual components, amplifiers and switchers; and a plurality of functional sub-menus for controlling said audio-visual components, amplifiers and switchers.

19. The audio-visual computer system of claim 18 wherein said switchers are IR controlled switchers adapted to be controlled by said IR transceiving means for integration and reconfiguration of interconnection of the audio-visual components through the use of a switcher functional sub-menu.

20. The audio-visual computer of claim 5 wherein said input means comprising means for receiving media content, graphic information and audio-visual components air-time program listing information comprises modem means and floppy disk drive means.

* * * * *